United States Patent
Shi et al.

(10) Patent No.: US 7,457,431 B2
(45) Date of Patent: Nov. 25, 2008

(54) SYSTEM AND METHOD FOR ROBUST REVERSIBLE DATA HIDING AND DATA RECOVERY IN THE SPATIAL DOMAIN

(75) Inventors: Yun-Qing Shi, Millburn, NJ (US); Zhicheng Ni, Kearny, NJ (US); Nirwan Ansari, Montville, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 584 days.

(21) Appl. No.: 11/004,041

(22) Filed: Dec. 3, 2004

(65) Prior Publication Data
US 2005/0141747 A1 Jun. 30, 2005

Related U.S. Application Data

(60) Provisional application No. 60/527,789, filed on Dec. 5, 2003.

(51) Int. Cl.
*G06K 9/00* (2006.01)
(52) U.S. Cl. ....................................................... 382/100
(58) Field of Classification Search ................... 382/100
See application file for complete search history.

(56) References Cited

U.S. PATENT DOCUMENTS

| | | | |
|---|---|---|---|
| 6,278,791 B1 | 8/2001 | Honsinger et al. | |
| 6,473,516 B1 | 10/2002 | Kawaguchi et al. | |
| 6,567,531 B1 | 5/2003 | Kondo et al. | |
| 6,807,285 B1 * | 10/2004 | Iwamura | 382/100 |
| 2004/0017926 A1 | 1/2004 | Tonisson | |

FOREIGN PATENT DOCUMENTS

WO   2005/057468 A3   6/2005

OTHER PUBLICATIONS

Macq et al., Trusted Headers For Medical Images, DFG VIII-D II Watermarking Workshop, Jul. 27, 1999, pp. 1-13.
Shi et al., Lossless Data Hiding: Fundamentals, Algorithms And Applications; Proceedings of IEEE Int'l Symposium on Circuits and Systems, vol. II, May 2004; pp. 1-4.
Fridrich et al., Invertible Authentication; Proc. SPIE Photonics West, Security and Watermarking of Multimedia Contents III, Jan. 2001, vol. 397, pp. 197-208.
Goljan et al., Distortion-Free Data Embedding for Images, Proceedings of 4th Information Hiding Workshop, Apr. 2001, pp. 1-15.

(Continued)

*Primary Examiner*—Colin LaRose
(74) *Attorney, Agent, or Firm*—Connolly Bove Lodge & Hutz LLP

(57) ABSTRACT

A method including identifying at least two subsets of pixels within a block of an image; forming a plurality of pixel groups from the at least two subsets of pixels, each pixel group having at least one pixel from a first of the at least two subsets and at least one pixel from a second of the at least two subsets; producing a plurality of difference values, each pixel group providing one of said difference values, each difference value being based on differences between pixel values of pixels within one of the pixel groups; and modifying pixel values of pixels in less than all of the at least two subsets, thereby embedding a bit value into the block.

50 Claims, 15 Drawing Sheets

OTHER PUBLICATIONS

Xuan et al., Distortionless Data Hiding Based On Integer Wavelet Transform, Electronics Letters, Dec. 5, 2002, vol. 38, No. 25, pp. 1646-1648.

Ni et al., Reversible Data Hiding, Proceedings of IEEE Int'l Symposium on Circuits and Systems, May 2003, pp. 912-915.

Celik et al., Reversible Data Hiding, Proceedings of the Int'l Conference on Image Processing, 2002, pp. 157-160.

J. Tian, Reversible Data Embedding Using A Difference Expansion, IEEE Transaction on Circuit and Sys. for Video Technology, Aug. 2003, vol. 13, No. 8, pp. 890-896.

De Vleeschouwer et al., Circular Interpretation Of Bijective Transformation in Lossless Watermarking For Media Asset Mgmt., IEEE Trans. Multimedia, Mar. 2003, vol. 5, pp. 97-105.

Bender et al., Techniques For Data Hiding, IBM Systems Journal, 1996, vol. 35, No. 3-4, pp. 313-336.

J. G. Proakis, Digital Communications, 4th Edition, 2000, pp. 438-439.

S. B. Wicker, Error Control System For Digital Communication And Storage, 1995, pp. 175-176.

Ni et al., Robust Lossless Image Data Hiding, Proceedings of IEEE Int'l Conference on Multimedia and Expo, 2004, pp. 1-4.

Voyatzis et al., Chaotic Mixing Of Digital Images And Applications To Watermarking, Proceedings Of European Conference Of Multimedia Applications, May 1996, pp. 687-695.

Zhang et al., A Unified Authentication Framework For JPEG2000, Proceedings of IEEE Int'l Conference on Multimedia and Expo, Jun. 2004, pp. 1-4.

Ebrahimi et al., Information Technology—JPSEC Commission Draft (ver. 1.0), WG1 N 3480, Nov. 2004, pp. 1-114.

Zhang et al., A Unified Authentication Framework for JPEG2000: System Description and Experiment Results, WG1 N3074, Sep. 17, 2003, pp. 1-6.

Sun et al., A Unified Authentication Framework For JPEG2000 Images, WG1 N2946, Jul. 14, 2003, pp. 1-6.

International Preliminary Report on Patentability, PCT/US2004/040528, issued Feb. 13, 2007.

\* cited by examiner

FIG. 1A
FIG. 1B
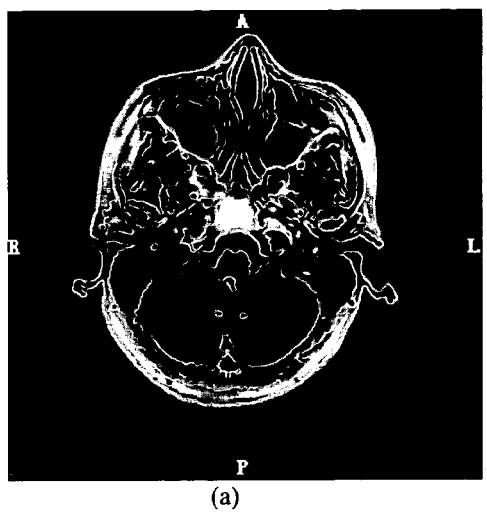
(a)
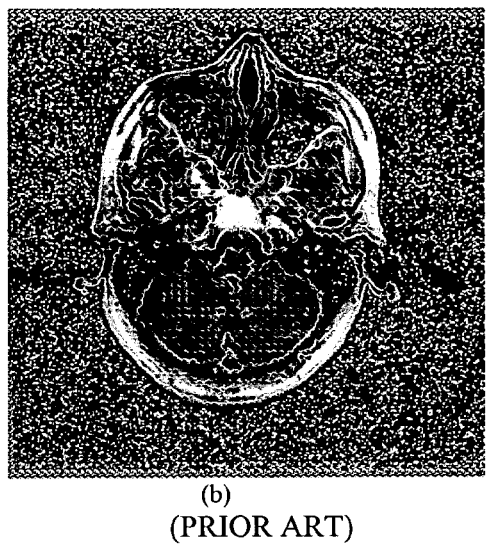
(b)
(PRIOR ART)
FIG. 2
200
| + | - | + | - | + | - | + | - |
|---|---|---|---|---|---|---|---|
| - | + | - | + | - | + | - | + |
| + | - | + | - | + | - | + | - |
| - | + | - | + | - | + | - | + |
| + | - | + | - | + | - | + | - |
| - | + | - | + | - | + | - | + |
| + | - | + | - | + | - | + | - |
| - | + | - | + | - | + | - | + |

Figure 3: the distribution of the difference value $\alpha$.

FIG. 18A
FIG. 18B
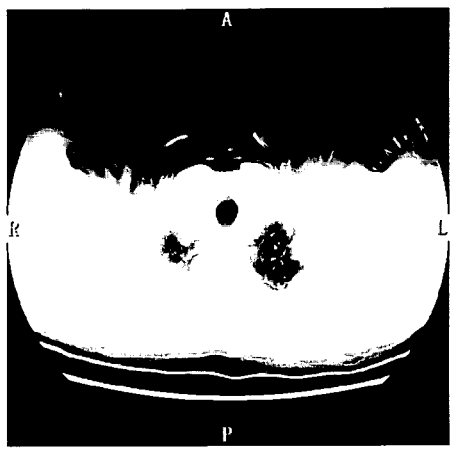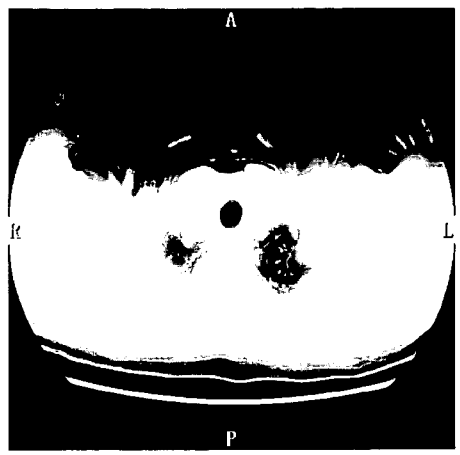
FIG. 19A
FIG. 19B
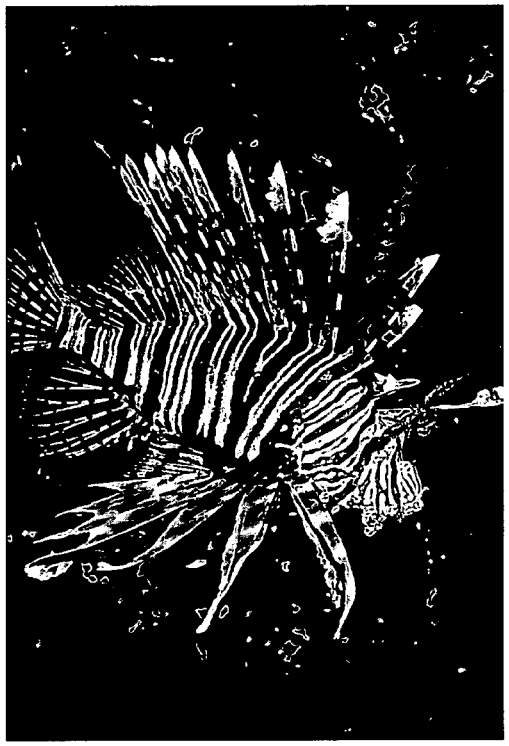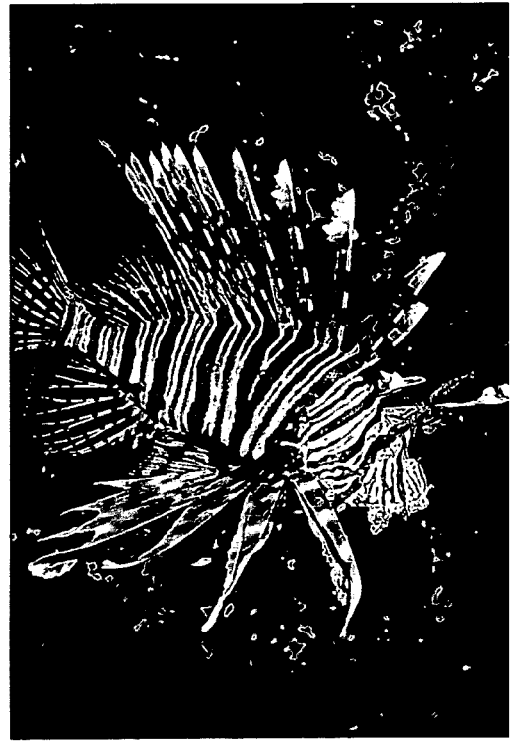

FIG. 20A
FIG. 20B
FIG. 21
|  | Lena | Baboon | Boat |
|---|---|---|---|
| PSNR (dB) | 40.2 | 38.7 | 40.5 |
| Capacity (bits) | 792 | 585 | 560 |
| Robustness (bpp) | 0.8 | 1.6 | 1.0 |
FIG. 22
| Images (512×768) | PSNR of marked image (dB) | | | Data embedding capacity (bits) | Robustness (bpp) | | |
|---|---|---|---|---|---|---|---|
|  | Max | Min | Avg | 714 | Max | Min | Avg |
|  | 45.2 | 37.4 | 40.2 |  | 2.0 | 0.2 | 1.21 |

FIG. 23

| Images (512×512) | PSNR of marked image (dB) | Data embedding capacity (bits) | Robustness (bpp) |
|---|---|---|---|
| Mpic1 | 37.6 | 100 | 0.4 |
| Mpic2 | 37.7 | 100 | 0.8 |
| Mpic3 | 37.6 | 100 | 0.4 |
| Mpic4 | 37.6 | 100 | 0.8 |
| Mpic5 | 37.6 | 100 | 0.4 |
| Mpic6 | 37.6 | 100 | 1.2 |
| Mpic7 | 37.6 | 100 | 0.4 |
| Mpic8 | 37.6 | 100 | 0.8 |

FIG. 24

| Images (1536×1920) | PSNR of marked image (dB) | Data embedding capacity (bits) | Robustness (bpp) |
|---|---|---|---|
| N1A (Woman) | 41.5 | 1410 | 0.8 |
| N2A | 41.3 | 1410 | 1.2 |
| N3A | 41.3 | 1410 | 0.8 |
| N4A | 41.4 | 1410 | 0.8 |
| N5A | 41.3 | 1410 | 0.8 |
| N6A | 41.2 | 805 | 0.4 |
| N7A | 41.2 | 1410 | 0.8 |
| N8A | 41.2 | 805 | 1.2 |

FIG. 25

| | Block size | Embed level | Mpic1 | | Mpic2 | | Mpic3 | | Mpic4 | | Mpic5 | | Mpic6 | | Mpic7 | | Mpic8 | |
|---|---|---|---|---|---|---|---|---|---|---|---|---|---|---|---|---|---|---|
| | | | PSNR (dB) | Robustness | PSNR (dB) | Robustness | PSNR (dB) | Robustness | PSNR (dB) | Robustness | PSNR (dB) | Robustness | PSNR (dB) | Robustness | PSNR (dB) | Robustness | PSNR (dB) | Robustness |
| Proposed algorithm | 8 | 4 | 40.5 | 0.4 | 40.7 | 0.8 | 40.6 | 0.8 | 40.6 | 0.8 | 40.6 | 0.8 | 40.5 | 1.2 | 40.5 | 0.4 | 40.5 | 0.8 |
| | | 6 | 37.6 | 0.4 | 37.7 | 0.8 | 37.6 | 0.4 | 37.6 | 0.8 | 37.6 | 0.4 | 37.6 | 1.2 | 37.6 | 0.4 | 37.6 | 0.8 |
| | | 8 | 35.4 | 0.4 | 35.6 | 0.8 | 35.5 | 0.4 | 35.4 | 0.4 | 35.4 | 0.4 | 35.5 | 0.8 | 35.4 | 0.4 | 35.4 | 0.4 |
| | | 10 | 33.7 | 0.4 | 33.8 | 0.4 | 33.7 | 0.4 | 33.7 | 0.4 | 33.7 | 0.4 | 33.7 | 0.8 | 33.7 | 0.4 | 33.7 | 0.4 |
| | 12 | 4 | 40.7 | 0.4 | 40.9 | 0.8 | 40.7 | 0.4 | 40.7 | 0.8 | 40.7 | 0.8 | 40.8 | 1.2 | 40.7 | 0.4 | 40.7 | 0.8 |
| | | 6 | 37.8 | 0.4 | 38 | 0.8 | 37.8 | 0.4 | 37.8 | 0.8 | 37.8 | 0.4 | 37.9 | 1.2 | 37.8 | 0.4 | 37.8 | 0.8 |
| | | 8 | 35.5 | 0.4 | 35.6 | 0.8 | 35.7 | 0.4 | 35.6 | 0.4 | 35.6 | 0.4 | 35.7 | 0.8 | 35.6 | 0.4 | 35.6 | 0.4 |
| | | 10 | 33.8 | 0.2 | 34.1 | 0.4 | 33.8 | 0.2 | 33.8 | 0.4 | 33.8 | 0.2 | 34 | 0.8 | 33.8 | 0.2 | 33.8 | 0.4 |
| | 16 | 4 | 40.6 | 0.4 | 40.9 | 0.8 | 40.6 | 0.4 | 40.6 | 0.8 | 40.6 | 0.4 | 40.7 | 1.2 | 40.6 | 0.4 | 40.5 | 0.8 |
| | | 6 | 37.7 | 0.2 | 38 | 0.4 | 37.7 | 0.2 | 37.7 | 0.4 | 37.7 | 0.2 | 37.8 | 0.8 | 37.6 | 0.2 | 37.6 | 0.4 |
| | | 8 | 35.5 | 0.4 | 35.9 | 0.8 | 35.5 | 0.4 | 35.5 | 0.4 | 35.5 | 0.4 | 35.6 | 0.8 | 35.5 | 0.4 | 35.4 | 0.4 |
| | | 10 | 33.8 | 0.2 | 34 | 0.4 | 33.8 | 0.2 | 33.8 | 0.4 | 33.8 | 0.2 | 33.9 | 0.8 | 33.8 | 0.2 | 33.7 | 0.4 |
| Algorithm in [9] | 8 | 4 | 9.9 | 1.6 | 4.9 | 1.6 | 29.0 | 1.2 | 29.1 | 0.8 | 29.1 | 1.6 | 5.8 | 2.0 | 10.1 | 0.8 | 6.2 | 1.2 |
| | | 6 | 9.9 | 0.8 | 4.9 | 1.6 | 28.1 | 0.8 | 28.2 | 0.4 | 28.2 | 0.8 | 5.9 | 2.0 | 10.5 | 0.8 | 6.3 | 1.6 |
| | | 8 | 9.9 | 0.8 | 5.0 | 2.0 | 27.1 | 0.8 | 27.2 | 0.4 | 27.2 | 1.6 | 5.9 | 1.6 | 10.3 | 0.8 | 6.3 | 2.0 |
| | | 10 | 9.8 | 1.6 | 5.1 | 1.6 | 26.1 | 0.8 | 26.2 | 0.4 | 26.2 | 0.8 | 6.0 | 2.0 | 7.8 | 0.8 | 6.4 | 2.0 |
| | 12 | 4 | 10.1 | 0.8 | 5.0 | 1.6 | 28.0 | 0.8 | 28.2 | 0.8 | 28.6 | 1.2 | 6.0 | 2.0 | 10.8 | 0.8 | 6.4 | 1.6 |
| | | 6 | 10.1 | 0.8 | 5.1 | 1.6 | 27.2 | 0.4 | 27.5 | 0.2 | 27.8 | 0.2 | 6.0 | 2.0 | 10.8 | 0.4 | 6.4 | 1.6 |
| | | 8 | 10.1 | 0.8 | 5.1 | 2.0 | 26.4 | 0.8 | 26.6 | 1.6 | 26.8 | 0.4 | 6.1 | 2.0 | 10.6 | 0.8 | 6.5 | 0.8 |
| | | 10 | 9.9 | 0.8 | 5.2 | 2.0 | 25.6 | 2.0 | 25.7 | 0.4 | 26.0 | 0.2 | 6.1 | 2.0 | 8.0 | 0.8 | 6.5 | 0.8 |
| | 16 | 4 | 10.6 | 0.8 | 5.3 | 1.6 | 29.0 | 0.8 | 29.2 | 0.8 | 29.2 | 0.4 | 6.4 | 1.2 | 11.2 | 0.8 | 6.9 | 1.2 |
| | | 6 | 10.6 | 0.8 | 5.4 | 0.8 | 28.2 | 2.0 | 28.3 | 0.2 | 28.3 | 0.2 | 6.4 | 0.8 | 11.3 | 0.4 | 7.0 | 0.8 |
| | | 8 | 10.6 | 0.8 | 5.4 | 1.6 | 27.3 | 0.8 | 27.4 | 0.4 | 27.4 | 0.4 | 6.5 | 1.6 | 11.1 | 0.8 | 7.0 | 0.8 |
| | | 10 | 10.4 | 0.8 | 5.5 | 0.8 | 26.3 | 0.2 | 26.4 | 0.2 | 26.4 | 0.2 | 6.5 | 0.8 | 8.1 | 0.4 | 7.0 | 0.8 |

FIG. 26

| | Block size | Embedding level | Average PSNR (dB) | | | Average robustness (bpp) | | |
|---|---|---|---|---|---|---|---|---|
| Proposed algorithm | 8 | 4 | 40.5 | 36.8* | 36.9** | 0.75 | 0.59* | 0.53** |
| | | 6 | 37.6 | | | 0.65 | | |
| | | 8 | 35.4 | | | 0.5 | | |
| | | 10 | 33.7 | | | 0.45 | | |
| | 12 | 4 | 40.7 | 37.0* | | 0.7 | 0.55* | |
| | | 6 | 37.8 | | | 0.65 | | |
| | | 8 | 35.6 | | | 0.5 | | |
| | | 10 | 33.8 | | | 0.35 | | |
| | 16 | 4 | 40.6 | 36.9* | | 0.65 | 0.46* | |
| | | 6 | 37.7 | | | 0.35 | | |
| | | 8 | 35.5 | | | 0.5 | | |
| | | 10 | 33.8 | | | 0.35 | | |
| Algorithm in [9] | 8 | 4 | 15.5 | 15.0* | 15.1** | 1.35 | 1.24* | 1.04** |
| | | 6 | 15.2 | | | 1.1 | | |
| | | 8 | 14.8 | | | 1.25 | | |
| | | 10 | 14.3 | | | 1.25 | | |
| | 12 | 4 | 15.4 | 14.8* | | 1.2 | 1.09* | |
| | | 6 | 15.0 | | | 0.9 | | |
| | | 8 | 14.7 | | | 1.15 | | |
| | | 10 | 14.0 | | | 1.125 | | |
| | 16 | 4 | 16.0 | 15.4* | | 0.95 | 0.78* | |
| | | 6 | 15.7 | | | 0.75 | | |
| | | 8 | 15.3 | | | 0.9 | | |
| | | 10 | 14.6 | | | 0.525 | | |

SYSTEM AND METHOD FOR ROBUST REVERSIBLE DATA HIDING AND DATA RECOVERY IN THE SPATIAL DOMAIN

CROSS-REFERENCE TO RELATED APPLICATIONS

This application claims the benefit of U.S. Provisional Patent Application Ser. No. 60/527,789, entitled "METHOD AND APPARATUS FOR LOSSLESS IMAGE DATA HIDING IN THE PIXEL DOMAIN," filed Dec. 5, 2003, the entire disclosure of which is hereby incorporated herein by reference.

BACKGROUND OF THE INVENTION

The present invention relates to methods and apparatus for embedding data in an image and recovering the embedded data therefrom.

Data hiding, also known as data concealing, is a process for embedding useful data (representing some information) into a cover media, such as image data. Cover media with data embedded therein is referred to herein as "marked media." Data hiding may be employed for the purposes of identification, annotation, copyright protection, fingerprinting, and authentication. In such applications, the hidden data and the cover media may be closely related. This type of data embedding is often referred to as watermarking or more generally as "marking." It is desirable for the hidden data to be perceptually transparent. Otherwise stated, the marked media should resemble the cover media as closely as possible.

The cover media will generally experience some distortion due to the presence of embedded data. Moreover, even after the embedded data are removed, it is generally difficult to restore the cover media to the condition it was in prior to embedding the data. Specifically, some permanent distortion of the cover media generally remains even after the hidden data have been extracted. The sources of distortion include round-off error, truncation error, and quantization error. This distortion presents a problem since for some applications such as medical diagnosis and law enforcement, it is important to accurately restore the cover media to the pre-embedding condition once the hidden data have been retrieved. The marking techniques satisfying this requirement are referred to as lossless or distortionless. Such marking techniques are also known as reversible marking techniques and are generally suitable for applications where the original media data should be accurately recovered.

Recently, some lossless marking techniques have been reported in the literature. The first method is carried out in the image spatial domain. See U.S. Pat. No. 6,278,791, issued Aug. 21, 2001, entitled "Lossless Recovery of an Original Image Containing Embedded Data," by C. W. Honsinger, P. Jones, M. Rabbani, and J. C. Stoffel, (referred to herein as "Honsinger"), the disclosure of which is hereby incorporated herein by reference.

Another spatial domain technique was reported in Fridrich. J. Fridrich, M. Goljan and R. Du, "Invertible authentication," Proc. SPIE, *Security and Watermarking of Multimedia Contents*, San Jose, Calif., January (2001) (referred to herein as "Fridrich"). The entire disclosure of this document is hereby incorporated herein by reference. There also exists a distortionless marking technique in the transform domain. B. Macq and F. Deweyand, "Trusted headers for medical images," *DFG VIII-D II Watermarking Workshop*, Erlangen, Germany, October 1999 (referred to herein as "Macq"). The entire disclosure of this document is hereby incorporated herein by reference.

Based on our studies, transform domain methods can generally only embed about 2000 bits of data (equivalent to 250 bytes) in a 512×512×8 image. Hence, such methods will generally not work for applications where it is desired to embed much larger quantities of data. The capacity of the method reported in "De Vleeschouwer" is also very limited except that it exhibits robustness against high quality JPEG compression. C. De Vleeschouwer, J. F. Delaigle and B. Macq, "Circular interpretation on histogram for reversible watermarking," *IEEE International Multimedia Signal Processing Workshop*, Cannes, France, pp. 345-350, October 2001 (referred to herein as "De Vleeschouwer") The entire disclosure of this document is hereby incorporated herein by reference. These techniques are directed to authentication rather than to data hiding, and the total quantity of data embedded in the cover media is therefore limited.

The first lossless marking technique that is suitable for high embedding rate data hiding was presented in Goljan, M. Goljan, J. Fridrich, and R. Du, "Distortion-free data embedding," *Proceedings of 4$^{th}$ Information Hiding Workshop*, Pittsburgh, Pa., April, 2001 (referred to herein as Goljan), the entire disclosure of which document is hereby incorporated herein by reference. In Goljan, the pixels in an image are divided into non-overlapped blocks, each block consisting of a number of adjacent pixels. For instance, this block could be a horizontal block having four consecutive pixels. A discrimination function is established to classify the blocks into three different categories: Regular, Singular, and Unusable. The authors used the discrimination function to capture the smoothness of the groups.

An invertible operation can be applied to groups. Specifically, the invertible operation can map a gray-level value to another gray-level value. This operation is invertible since applying it to a gray level value twice produces the original gray level value. This invertible operation is therefore called "flipping." For typical images, flipping with a small amplitude will lead to an increase of the discrimination function, resulting in more regular groups and fewer singular groups. It is this bias that enables distortionless data hiding. While this approach hides data without distorting the cover data, the quantity of data which may be hidden employing this technique is still not large enough for certain applications. The payload was estimated to be in a range from 3,000 bits to 24,000 bits for a 512×512×8 gray image according to Goljan. Another problem with the method is that as the quantity of data embedded in the image increases, the visual quality of the image decreases. For instance, the PSNR (Peak Signal to Noise Ratio) may drop as low as 35 dB (decibels), and some undesired artifacts may appear in the image.

A method by Xuan, based on the integer wavelet transform, is a recently proposed reversible data hiding technique that can embed a large quantity of data. Guorong Xuan, Jidong Chen, Jiang Zhu, Yun Q. Shi, Zhicheng Ni, Wei Su, "Distortionless Data Hiding Based on Integer Wavelet Transform," *IEEE International Workshop on Multimedia Signal Processing*, St. Thomas, US Virgin islands, December 2002 (referred to herein as "Xuan"). This document is hereby incorporated herein by reference. The main idea in Xuan is as follows. After the integer wavelet transform is applied to the original image, the bias between binary ones and binary zeroes in the bit-planes of the sub-bands LH, HL, and HH is significantly increased. Hence, the ones and zeroes and in these bit planes can be losslessly compressed to leave a lot of storage space for data embedding. After data embedding, an inverse integer wavelet transform is applied to form the marked image. The capacity achieved in this technique is quite large. The PSNR of the marked image is, however, not high due to the histogram modification applied in order to avoid overflow or underflow conditions. For some images, the PSNR is only 28 dB.

One method based on histogram manipulation is a recently disclosed lossless data hiding technique, which can embed a large amount of data (5 k-80 k bits for a 512×512×8 grayscale image) while preserving high visual quality (the PSNR is guaranteed to be above 48 dB) for a vast majority of images. Z. Ni, Y. Q. Shi, N. Ansari and W. Su, "Reversible data hiding," *IEEE International Symposium on Circuits and Systems*, May 2003, Bangkok, Thailand, (referred to herein as "Ni"). This document is hereby incorporated herein by reference. This document (Ni) is not conceded to be prior art merely through its placement in the "Background of the Invention" section of this patent application.

However, only one prior lossless data hiding technique (Vleeschouwer) is robust against compression applied to the stego-image (the image including the embedded data). Specifically, only in Vleeschouwer can the hidden data still be extracted out correctly after the stego-media has gone through compression. With the other existing techniques, the embedded data cannot be recovered without error after stego-media compression.

While the De Vleeschouwer technique is robust to compression, it generates annoying salt-and-pepper noise because it uses modulo-256 addition. That is, when the pixel grayscale value is close to 256 (brightest) and/or 0 (darkest), the modulo-256 addition will likely cause flipping over between the brightest and darkest gray values. This often happens with medical images. One example is shown in FIG. 1, where FIG. 1A is an original medical image, and FIG. 1B is a stego-image. This type of salt-and-pepper noise is unacceptable for many applications. Therefore, there is a need in the art for a system and method for embedding an amount of robust data into cover media in a reversible manner (the original cover media can be preserved) without annoying salt-and-pepper noise.

In addition to hiding data, the embedding of data in cover media, such as images, can be employed for image authentication. Traditional digital signature techniques, such as DSA (Digital Signature Algorithm or RSA (Rivest, Shamir, Adleman) can provide effective and secure solutions for data authentication, which covers both data integrity protection and non-repudiation. Generally, modification of even a single bit will make the protected data inauthentic, which is advantageous since as every bit of data is vital. For example, if a transaction is made on-line, the exchanged data may contain information such as the amount of a payment, an account number, or payee's name. In this situation, a modification of even a single bit of such information will cause such a transaction to fail.

Directly applying the traditional digital signature techniques to image data can provide good protection of image data, but in an unreasonably strict way. Such authentication in image data is called "fragile authentication." As images are exchanged between different entities within different media, the images unavoidably experience incidental distortion introduced by image transcoding, unreliable carrier actions, and multiple cycles of encoding and decoding. Although the incidental distortion changes image data, it doesn't change the meaning of the image from human's point of view. An image which has not been deliberately corrupted but which experiences incidental distortion will be considered unauthentic when employing the traditional digital-signature-based authentication scheme. Therefore, the fragility of traditional digital-signature techniques limits their application to image data. Accordingly, there is a need in the art for a system and method for embedding authentication data within cover media, such as images, which preserves a status of authenticity of the embedded data in the face of incidental distortion of the cover media.

SUMMARY OF THE INVENTION

According to one aspect, the invention provides a method, comprising: identifying at least two subsets of pixels within a block of an image; forming a plurality of pixel groups from said at least two subsets of pixels, each said pixel group having at least one pixel from a first of said at least two subsets and at least one pixel from a second of said at least two subsets; producing a plurality of difference values, each said pixel group providing one of said difference values, each said difference value being based on differences between pixel values of pixels within one of said pixel groups; and modifying pixel values of pixels in less than all of said at least two subsets, thereby embedding a bit value into said block. Preferably, less than all subsets comprises only one subset. Preferably, the modifying causes a logical-1 bit value to be embedded into said block. Preferably, the method further comprises identifying a contrast status of said block; and customizing said modifying according to said contrast status. Preferably, the identifying said contrast status comprises identifying a status of a histogram of said block. Preferably, the identifying said contrast status comprises: identifying a block difference value for said block, said block difference value being equal to an arithmetic average of said difference values. Preferably, the method further comprises: employing error correction coding to correct any bit errors in said block. Preferably, the at least two subsets comprise exactly two subsets and said pixel groups all include exactly two pixels and wherein said producing comprises: setting each said difference value equal to a difference in pixel values between said exactly two pixels of each said pixel group. Preferably, the at least two subsets comprise only said first subset and said second subset and said block comprises a checkerboard distribution pattern of pixels of said first subset and said second subset. Preferably, the method further comprises: calculating a block difference value for said block of said image, said block difference value being equal to an average of said plurality of difference values. Preferably, the method further comprises: changing said block difference value by a shift quantity. Preferably, the shift quantity has a predetermined magnitude. Preferably, the changing said block difference value causes a bit value to be embedded in said block of said image. Preferably, the method further comprises establishing a difference value threshold. Preferably, the shift quantity exceeds a magnitude of said difference value threshold. Preferably, the changing said block difference value comprises: embedding a logical-1 bit value in said block of said image. Preferably, the embedded bit value is recoverable. Preferably, the embedding comprises: concealing said bit value in said block of said image. Preferably, the embedding comprises: providing at least a portion of a digital signature in said block of said image. Preferably, the pixel values are gray-scale values. Preferably, the pixel values comprise chromatic information.

According to another aspect, the invention provides a method comprising: dividing a block of an image into at least two subsets of pixels, the block including an embedded bit value; forming a plurality of pixel groups from said at least two subsets of pixels, each said pixel group having at least one pixel from a first of said at least two subsets and at least one pixel from a second of said at least two subsets; producing a plurality of difference values, each said pixel group providing one of said difference values, each said difference value being based on differences between pixel values of pixels within one of said pixel groups; extracting said embedded bit value from said block; and restoring said pixel values to a condition of said pixel values prior an introduction of said embedded bit value, said restoring comprising maintaining pixel values of pixels in at least one of said subsets unchanged. Preferably, the extracting comprises: extracting a logical-1 bit value from said block if said block difference value exceeds a difference value threshold. Preferably, the extracting comprises: extracting a logical-0 bit value from said block if said block difference value is less than a difference value threshold. Preferably, the method further comprises: identifying a contrast status of said block; and customizing said extracting according to said contrast status. Preferably, the method further comprises: customizing said restoring according to said contrast status. Preferably, the identifying said contrast status comprises: identifying a status of a histogram of said block. Preferably, the identifying said contrast status comprises: identifying a block difference value for said block. Preferably, the method further comprises: employing error correction decoding to correct any error in said extracted embedded bit value.

According to another aspect, the invention provides a method comprising: identifying at least two subsets of pixels within a block of an image; forming a plurality of pixel groups from said at least two subsets of pixels, each said pixel group having at least one pixel from a first of said at least two subsets and at least one pixel from a second of said at least two subsets; producing a plurality of difference values, each said pixel group providing one of said difference values, each said difference value being based on differences between pixel values of pixels within one of said pixel groups; calculating an initial block difference value for said block of said image, said initial block difference value being equal to an average of said plurality of difference value; and establishing a final block difference value for said block of said image based on one of a logical-0 bit value and a logical-1 bit value indicated for inclusion in said block, said establishing comprising leaving pixel values for pixels within at least one of said subsets unchanged. Preferably, the establishing said final block difference value comprises: changing said initial block difference value by a shift quantity, thereby embedding a logical-1 bit value in said block of said image. Preferably, the changing said initial block difference value comprises: changing pixel values of pixels within only one of said subsets. Preferably, the establishing said final block difference value comprises: leaving said initial block difference value unchanged, thereby embedding a logical-0 bit value in said block of said image.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 1A is an original medical image, and FIG. 1B is a stego image (a marked image incorporating embedded data) of the image shown in FIG. 1A produced according to a prior art method;

FIG. 2 is a diagram illustrating an 8×8 block having pixels divided into two subsets in accordance with one or more aspects of the present invention;

FIGS. 18A-20A and 18B-20B are original and marked versions, respectively, of images which have marked employing a method in accordance with one or more aspects of the present invention, where in each case, the figure number having an "A" suffix is an original image and the figure image number having the same initial numerals but having a "B" suffix is the marked version of this original image;

FIG. 21 is a data table illustrating test results for commonly used 512×512×8 grayscale images that were marked employing methods in accordance with one or more aspects of the present invention;

FIG. 22 is a data table illustrating test results for images in the CorelDraw™ database marked employing methods in accordance with one or more aspects of the present invention;

FIG. 23 is a data table illustrating test results for eight medical images, using a block size of eight pixels on a side, and an embedding level of six, that were marked employing methods in accordance with one or more aspects of the present invention;

FIG. 24 is a data table illustrating test results for eight JPEG2000 color test images, using a block size of twenty pixels on a side and an embedding level of 8, that were marked employing methods in accordance with one or more aspects of the present invention;

FIG. 25 is a data table illustrating test results for various combinations of block sizes and embedding levels employing a prior-art method and a preferred-embodiment method on eight medical images, in which the listed "robustness" against image compression is the minimum surviving bit rate, expressed in terms of bits per pixel (bpp);

FIG. 26 is a data table illustrating a performance comparison for the PSNR (Peak Signal to Noise Ratio) and average robustness against compression of a marked image and of an original image between a preferred-embodiment method disclosed herein and a prior art method;

DETAILED DESCRIPTION OF THE PREFERRED EMBODIMENTS

Figure 3:
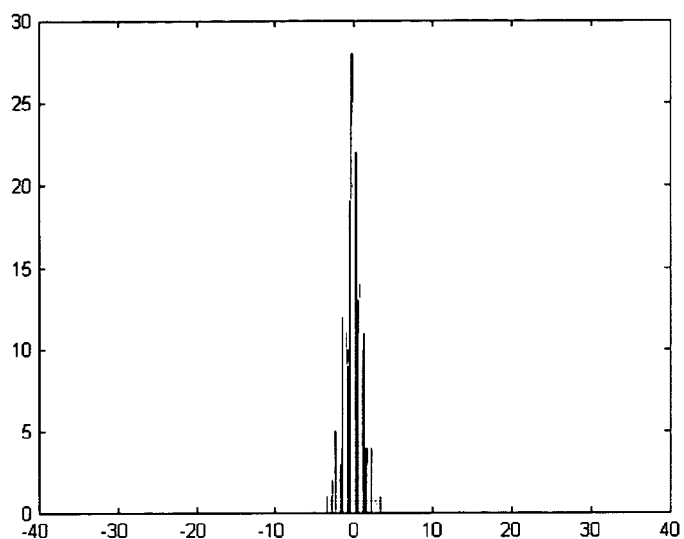
FIG. 3 is a graph illustrating a distribution of block difference values over a range of block difference value magnitudes in accordance with one or more aspects of the present invention.

In a preferred embodiment, an image is divided into non-overlapping blocks. Preferably, each block of the image is then divided into two or more subsets. Each of the subsets preferably has the same number of pixels, but alternatively, pixel subsets may have different numbers of pixels. Preferably, the distribution of pixels from different subsets in the checkerboard pattern of FIG. 2. However, other distribution patterns are possible. Thus, the characteristics of each subset are preferably similar. The pixel values may be values of gray-level brightness. The pixel values may additionally or alternatively be a component of chromatic information. For instance, pixel values may be one of the RGB (Red, Green, Blue) triplet values of a color image.

In a preferred embodiment, one or more pixel values of the pixels in a subset may be manipulated to practice one more aspects of the present invention. Channel coding such as with BCH (Bose-Chaudhuri-Hocquenghem) codes may be employed in conjunction with the inventive principles disclosed herein. Moreover, a scrambling technique may be employed in conjunction with the current invention.

The medical image of FIG. 18A is employed to illustrate the various aspects of the present invention. For a given gray-scale image, which is 512×512×8 (where the "512" number represents pixels and the "8" represents the number of bits in the gray-scale representation), the following actions may be performed in accordance with one or more aspects of the present invention. First, the image is split into non-overlapping blocks. For example, the block size can be 8×8, as shown in FIG. 2, thereby providing a block with 64 pixels. Preferably, a block 200 is divided into two subsets, thereby providing subsets having 32 pixels each. In the embodiment of FIG. 2, one subset consists of the pixels marked by '+', and the other subset consists of the pixels marked by '−'. However, it will be appreciated that blocks with fewer or more than 64 pixels may be employed. Moreover, the blocks may be divided into more than two subsets.

In the embodiment of FIG. 2, the "+" and "−" pixels are arranged in a "checkerboard" pattern in which a pattern of alternating "+" pixels and "−" pixels is encountered when proceeding along any row or column in the block 200. This fine dispersion of the subset of "+" pixels, whose pixel values may be modified by the preferred data embedding method disclosed herein, preferably presents the benefit of providing a lower value of a than occurs when the subsets of pixels are merely randomly dispersed throughout a block. However, the present invention is not limited to the particular distribution of the "+" pixels and the "−" pixels shown in FIG. 2.

In one embodiment, for each block, a block difference value $\alpha$ is calculated. Herein, the block difference value $\alpha$ is the arithmetic average of differences between grayscale values of pixel pairs within the block. Specifically, one may define pixel pairs as two neighboring pixels horizontally, say, from left to right, from top to bottom, as shown in FIG. 2. More generally, instead of dividing the block into pixel "pairs," "pixel groups" may be created which groups include more than two pixels each. Also, the pixels in a pixel pair, or in a pixel group having more than two pixels, need not be adjacent to each other. Moreover, characteristics of the pixels other than grayscale values may be employed for the calculation of difference values within each pixel group and for the block difference value representing an entire block. For example, these other characteristics include but are not limited to being one or more of the "R," "G," and "B" values of each pixel. Moreover, other chromatic information on each pixel may be employed. Herein, the term "pixel value" generally refers to the numerical value, for a given pixel, and for a given characteristic, that a pixel possesses.

For example a case is considered where a comparison is drawn between a pair of pixels using the characteristic of gray-scale value. In this example, pixel A has a gray-scale pixel value of 32, and pixel B has a gray-scale pixel value of 34. Thus, the difference value for this pixel pair is 2. If there were only one other pair in the block containing pixels A and B which has a difference value equal to 1, the block difference value $\alpha$ would equal 1.5, since 1.5 is the arithmetic average of "1" and "2."

Another example, as part of an alternative embodiment, is considered in which the a pixel group includes an odd number of pixels with this odd number being greater than two. In this example, a pixel group includes three pixels (numbered P1, P2, and P3) having the following "R" (the red portion of RGB) pixel values: P1: 20, P2: 30, and P3: 60. To determine a difference value for this pixel group, we sum the differences between various pairings of the pixel values and divide by the number of pixels in the group. Thus, difference 1=10 (P2-P1), difference 2=40 (P3-P1), and difference 3=30 (P3-P2). In this example, the difference value for the pixel group is therefore (10+40+30)/3=80/3=26.6. It will be appreciated that the foregoing formula for calculating a difference value for a pixel group having more than two pixels may be applied to pixel groups of any size. Moreover, other formulae for determining the difference value for a pixel group, such as the average deviation from a mean pixel value by the pixel values of a pixel group may also be employed. Moreover, a multiple of this average deviation from a mean pixel value for a pixel group may also be employed.

Since the pixel values within a block are generally highly correlated, the block difference value $\alpha$ is expected to be very close to zero. Experimental results support this observation. The distribution of the block difference value $\alpha$ among blocks in an image is shown in the FIG. 3. FIG. 3 shows that most of the values of $\alpha$ are very close to zero. Moreover, the mean value of the distribution shown in FIG. 3 is very close to zero.

Preferably, since the block difference value $\alpha$ is based on all pixels in each block, this value $\alpha$ has certain robustness against attacks (such as compression and other slight alteration). We select this block difference value $\alpha$ as a robust quantity and use it to embed data.

In a preferred embodiment, we divide a cover image into non-overlapping blocks. Then one bit is preferably embedded in each block. Preferably, when embedding bits, the block difference value $\alpha$ is kept within a range defined by thresholds K and –K to embed a logical-0 bit. The value of K has usually been less than 5 in numerous experiments conducted to date. However, values of K and –K having absolute values smaller or greater than 5 may also be employed. To embed a logical-1 bit, the absolute value of the block difference value $\alpha$ is preferably shifted out of the range between K and –K.

As discussed above, although employing modulo-256 addition may effectively address the overflow/underflow problem, it tends to introduce unacceptable salt-and-pepper noise. In one embodiment of the present invention, the overflow/underflow problem may be addressed by dividing the blocks of an image into four different categories and using bit-embedding scheme that is suited for each category.

Both the underlying theory and the obtained experimental results demonstrate that this preferred approach successfully solves the overflow/underflow problem and avoids the salt-and-pepper noise at the same time. The preferred bit-embedding schemes for each of the categories are discussed below. In the algorithm, the shift quantity (also referred to as the "embedding level") $\beta$ is preferably twice the value of the threshold K. However, in alternative embodiments, the shift quantity $\beta$ may also be less than or more than twice the value of K.

Figure 5:
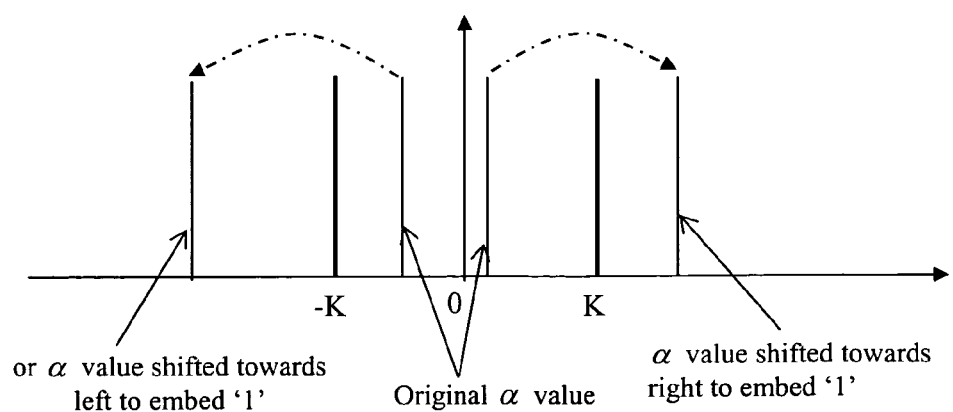
FIG. 5 is a graph illustrating the change in magnitude of a block difference value arising from embedding a bit in a block for a category 1, case 1 situation, in accordance with one or more aspects of the present invention.

In a preferred embodiment, shifting $\alpha$ towards the right-hand side (FIG. 5) is accomplished by adding shift quantity $\beta$ to the grayscale pixel value of each pixel marked by '+' in the block (FIG. 2). Similarly, shifting a towards the left-hand side (FIG. 5) is preferably accomplished by subtracting a fixed shift quantity $\beta$ from the grayscale value of each pixel marked by '+' in the block (FIG. 2). In a preferred embodiment, the grayscale pixel values of pixels marked by '–' in block 200 are not modified, thereby reducing the distortion caused by the bit-embedding. However, in an alternative embodiment, the value of a may be increased by adding or subtracting shift quantity $\beta$ from the "–" pixels.

Under certain circumstances, discussed below, embedding either a logical-0 bit value or a logical-1 bit value into a block may cause the subsequent bit extraction process to extract an erroneous bit for that block. Preferably, error correction coding (ECC) and associated error correction decoding are employed to detect and/or correct such errors. In one embodiment, the error correction coding employs overhead bits embedded into other blocks from the same image, or from another image, to determine which extracted bits are erroneous and to correct them. In alternative embodiments, overhead data may be stored elsewhere and be employed to identify and correct erroneous extracted data bits. For instance, overhead data for use in error correction may be included in "side information" associated with a block or with an entire image.

In the following, various approaches for embedding data into a block are discussed, the approaches depending upon the block histogram and the block difference value $\alpha$ of the block. Herein, the term "contrast status" of a block can include the status of the histogram of the block, the block difference value $\alpha$ for the block, or both the histogram status and the block difference value $\alpha$. Moreover, the aspects of the block included in the contrast status of a block are not limited to those discussed above.

Figure 4:
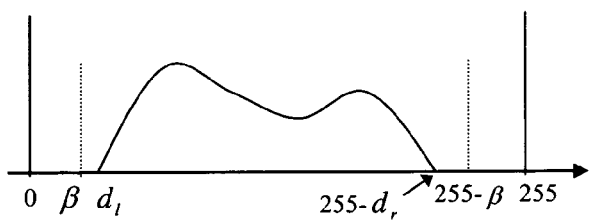
FIG. 4 is a graph illustrating a histogram of grayscale pixel values for a category 1 image, this image being suitable for data embedding in accordance with one or more aspects of the present invention.

Category 1:

The grayscale pixel values of a block under consideration are far enough away from the two bounds of a histogram (0 and 255 for an 8-bit grayscale image) for the shift quantity to be added without causing an underflow/overflow condition. Specifically, the distance $d=\min(d_l, d_r)$ satisfies $d \geq \beta$ (where $\beta$ is the shift quantity), as shown in FIG. 4. Two cases within category 1 are considered below. The cases are identified according to the values of the block difference value $\alpha$.

In a preferred embodiment, the values of the "+" pixels of a block are modified to embed a logical-1 bit value, and the values of all pixels are preferably left unchanged to embed a logical-0 value in a block. However, in alternative embodiments, this bit-value convention could be reversed, and selected pixels could be modified to embed a logical-0 value, while the pixels could be left unchanged to embed a logical-1 value.

Case 1: The block difference value $\alpha$ is located between the thresholds K and –K.

If the bit to be embedded in a block is a logical-1, the block difference value $\alpha$ is preferably shifted by a quantity $\beta$ toward the right if a is positive and toward the left if $\alpha$ is negative. See FIG. 5. If the bit to be embedded in a block is a logical-0, the pixel values of that block are preferably left unchanged, thereby leaving $\alpha$ unchanged.

Figure 6:
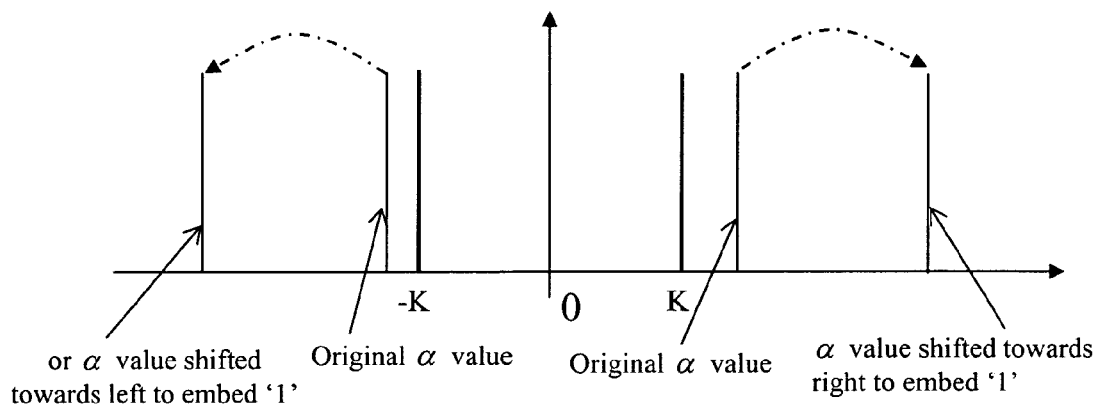
FIG. 6 is a graph illustrating the change in magnitude of a block difference value arising from embedding a bit in a block for a category 1, case 2 situation, in accordance with one or more aspects of the present invention.

Case 2: The absolute value of α exceeds the absolute value of the threshold K. (See FIG. 6).

To ensure that the data extraction method, which method is described later in this document, does not destroy any image data, the data embedding method preferably embeds a logical-1 bit value into the block regardless of the value of α prior to the embedding steps. Thus, where a logical-1 bit value is slated for embedding into a block, the block difference value α is preferably shifted further away from zero by the shift quantity β (see FIG. 6). In this situation, even where logical-0 bit value is slated for embedding in the block, a logical-1 bit value is preferably embedded by shifting the difference value α away from zero by the shift quantity β. Embedding bit values according to the above-described method may modify block 200 in a way which will produce an error bit when the extraction method is performed later. Thus, ECC and error correction decoding (ECD) are preferably employed to correct any such errors.

Figure 7:
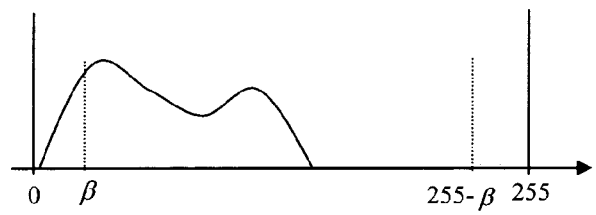
FIG. 7 is a graph illustrating a histogram of grayscale pixel values for a category 2 image, this image being suitable for data embedding in accordance with one or more aspects of the present invention.

Category 2:

Referring to FIG. 7, in a category 2 histogram, some grayscale pixel values of the block under consideration are very close to the lower bound (which corresponds to a value of zero for an eight-bit grayscale image) of the histogram, while no grayscale pixel values are close to the upper bound of the histogram. For category 2, three cases are considered below. The cases defined according to various values of the block difference value α.

Case 1: The block difference value α is located between the thresholds K and −K.

If a logical-1 bit value is to be embedded, the block difference value α is shifted by shift quantity β towards the right-hand side beyond the threshold K. See FIG. 8. If a logical-0 bit value is to be embedded, the block difference value α is preferably left unchanged.

Case 2: The value block difference value α is located on the right-hand side of the histogram beyond the threshold K (see FIG. 9).

Figure 9:
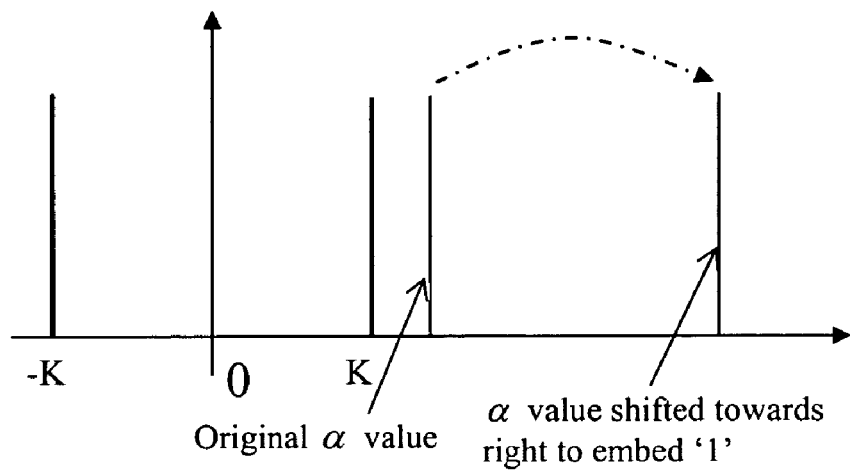
FIG. 9 is a graph illustrating the change in magnitude of a block difference value arising from embedding a bit in a block for a category 2, case 2 situation, in accordance with one or more aspects of the present invention.

Whether a logical-0 or logical-1 bit value is slated for embedding in the block under consideration, the preferred-embodiment system and method embeds a logical-1 bit value by shifting the block difference value α by shift quantity β, thereby moving block difference value α further away from the zero point, as shown in FIG. 9. Embedding a logical-1 bit value regardless of the value of the bit slated for embedding in the block, may cause the extraction method to extract an erroneous bit value from this block. In this situation, error correction coding/decoding is preferably employed to correct the erroneous bit.

Figure 10:
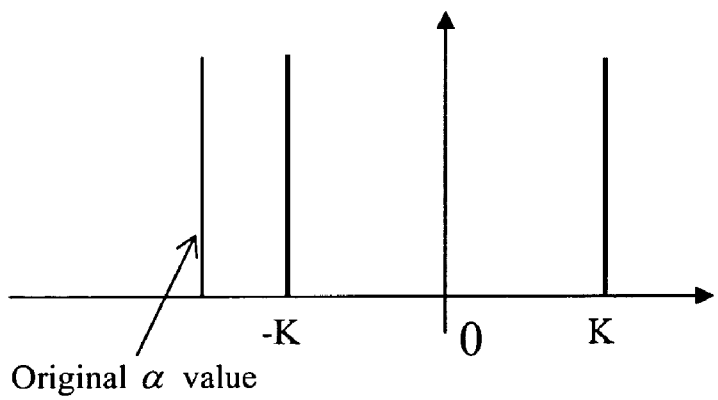
FIG. 10 is a graph illustrating the change in magnitude of a block difference value arising from embedding a bit in a block for a category 2, case 3 situation, in accordance with one or more aspects of the present invention.

Case 3: The block difference value α is located on the left-hand side of the histogram beyond the threshold −K (see FIG. 10).

This situation presents a problem in that the block difference value α exceeds the absolute value of the threshold even before any shift quantity has been added. And, either keeping the difference value α unchanged or moving it further away from zero can defeat the reversibility of the reversibility of the data embedding and extraction process. In one embodiment, this problem may be addressed by increasing the value of the threshold K thereby bringing α inside a range defined by the updated values of −K and K. It is noted that if K is changed for a particular block, data for all blocks in the image should preferably be re-embedded employing this increased value of K.

In another embodiment, the block size used for embedding data into the image in question could be increased. Increasing the block size generally operates to decrease the value of α for the various blocks of an image. Preferably a block size is selected which reduces the value of α below the value of the threshold K for all blocks in an image. As with the case where the value of K is increased, the data embedding method is preferably repeated for all blocks in the image once a new block size is decided upon.

Figure 8:
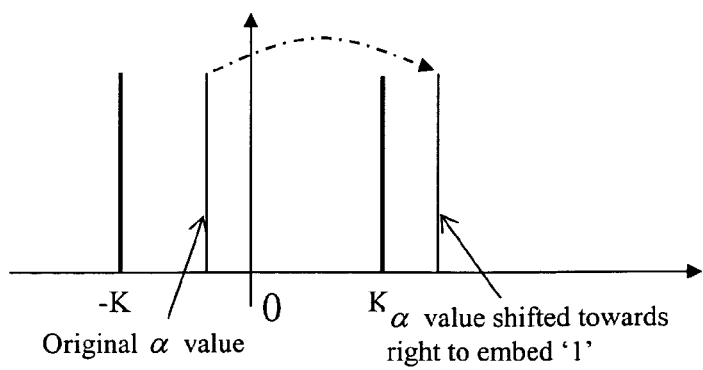
FIG. 8 is a graph illustrating the change in magnitude of a block difference value arising from embedding a bit in a block for a category 2, case 1 situation, in accordance with one or more aspects of the present invention.

Employing either a larger value of K or a larger block size preferably avoids the situation of case 3 and causes the relationship of the various difference values to revert to that of case 1, as shown in FIG. 8. Experimental results have shown that case 3 occurs only rarely. Moreover, in a preferred embodiment, a moderate increase in either the K value or of the block size usually resolves the issue.

Figure 11:
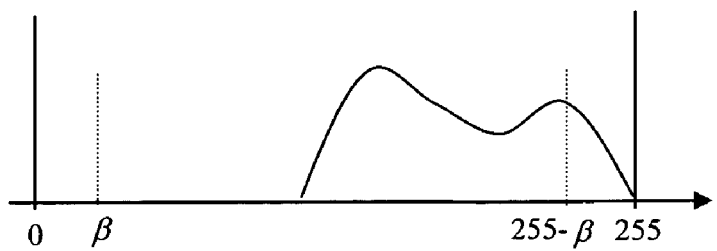
FIG. 11 is a graph illustrating a histogram of grayscale pixel values for a category 3 image, this image being suitable for data embedding in accordance with one or more aspects of the present invention.

Category 3:

Referring to FIG. 11, generally, in a category 3 histogram of grayscale pixel values in a block, there are grayscale pixel values close to the upper bound of the histogram (i.e. value=255 on the horizontal axis), but there are few if any pixel grayscale values close to the lower bound of the histogram.

Category 3 is similar to Category 2 except that the concentration of grayscale pixel values is close to the upper bound instead of the lower bound of the histogram. Hence, the preferred-embodiment data embedding algorithm for the situation of category 3 is similar to that of category 2 except that the block difference value α is preferably shifted towards the left rather than towards the right.

Figure 12:
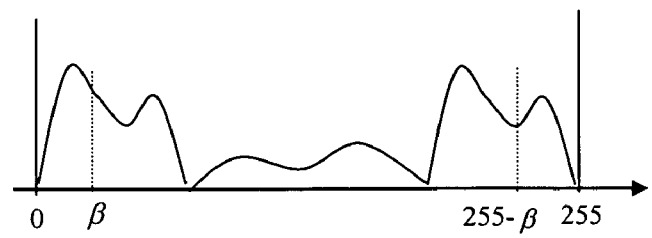
FIG. 12 is a graph illustrating a histogram of grayscale pixel values for a category 4 image, this image being suitable for data embedding in accordance with one or more aspects of the present invention.

Category 4:

Referring to FIG. 12, in a histogram of a block in a category 4 situation, there are grayscale pixel values close to both the upper bound and the lower bound of the histogram. In this category, we further consider two different cases according to the block difference value α.

Case 1: The value α is located between the thresholds K and −K.

Figure 13:
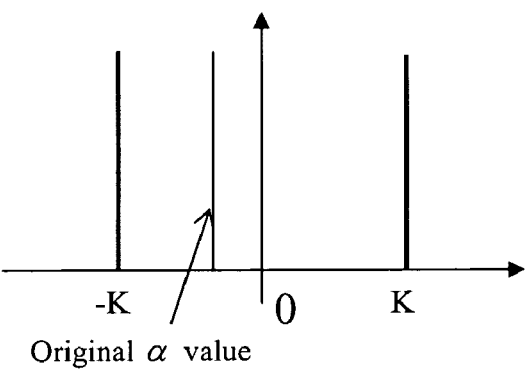
FIG. 13 is a graph illustrating the change in magnitude of a block difference value arising from embedding a bit in a block for a category 4, case 1 situation, in accordance with one or more aspects of the present invention.

In a preferred embodiment, whether a logical-0 bit value or a logical-1 bit value is slated for embedding in this block, the preferred method embeds a logical-0 bit value into the block. Embedding a logical-0 value preferably includes leaving the value of α unchanged, as shown in FIG. 13. Unconditionally embedding a logical-0 bit value, as described, may cause the extraction method to extract an erroneous bit value for this block, in that the extracted bit value may not equal the bit value that was slated to be embedded in this block. If an erroneous bit value is extracted by the extraction method, the error is preferably corrected using error correction coding/decoding.

Figure 14:
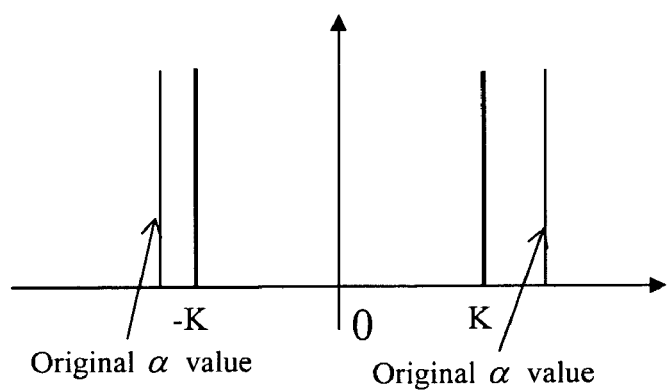
FIG. 14 is a graph illustrating the change in magnitude of a block difference value arising from embedding a bit in a block for a category 4, case 2 situation, in accordance with one or more aspects of the present invention.

Case 2: The absolute value α is beyond the threshold K (See FIG. 14).

In a preferred embodiment, as with category 4, case 1, above, we do not change grayscale pixel values for the block. Specifically, a logical-0 bit value is embedded into the block regardless of the bit value slated for embedding in the block. Unconditionally embedding a logical-0 bit value as described may cause an erroneous bit value to be extracted later, during operation of the extraction method. Preferably, error correction coding/decoding is employed to detect and correct any such bit value extraction errors. When decoding, the grayscale value distribution of the block is first examined. Once a situation corresponding to case 2 of category 4 is identified, bit '0' is extracted, and the grayscale values of this block will remain unchanged.

The above-mentioned four categories preferably describe all of the conditions that a block can be in when it is due to be processed by the preferred data embedding method disclosed herein. Employing the approaches described above for the various cases of the listed categories preferably keeps all grayscale pixel values within the range of [0,255], thereby precluding the occurrence of any data overflow/underflow conditions and consequently preventing any loss of image data. Any error bits generated through the use of the data embedding method described above are preferably handled by the error correction coding/decoding method described below. However, other error correction methods may be employed.

Error Correction Code

In one embodiment, the above-described bit-embedding process may introduce some erroneous bit values. Specifically, some blocks may cause the extraction program to extract bit values that do not correspond to the bit values that were slated to be embedded in that block. As discussed above, this type of error may be introduced by unconditionally entering either a logical-0 bit value or a logical-1 bit value based on the condition of the block's histogram and the value of the block difference value $\alpha$. This approach presents the benefit of leaving the image undisturbed by the embedding and extraction processes, but has the drawback of possibly generating error bits when an affected block of the image is operated on by the preferred data extraction system and method.

In a preferred embodiment, in order to accurately recover the original (i.e. prior to the embedding of the bits into the various blocks of the image) information bits correctly, error correction coding is preferably employed. In one embodiment, the use of error correction coding provides the benefit of error correction but also reduces the number of information bits that can be stored in an image. In this embodiment, this reduction in the information bit embedding capacity of an image arises from a need to store a significant number of overhead bits to accompany the information bits.

Bose-Chaudhuri-Hocquenghem (BCH) codes are a powerful class of cyclic codes that provide a large selection of block lengths, code rates, alphabet sizes, and error-correcting capability. See J. G. Proakis, *Digital Communication, 4th Edition*, Mcgraw-Hill 2000, the entire disclosure of which is incorporated by reference herein. Accordingly, a preferred embodiment of the system and method disclosed herein employs BCH codes for error detection and correction. In preferred embodiments, the following codes may be employed: BCH (15,11,1), BCH (15,7,2), BCH (15,5,3), BCH (31,6,7) and BCH (63,7,15). The availability of the range of BCH codes preferably facilitates the tradeoff between the coding ratio, and thus the payload, of the error correction coding on the one hand and the error-correcting power of the error correction coding on the other hand. The degree of robustness of the lossless data hiding generally increases with increasing error-correcting power.

For example, BCH (63,7,15) code is the most powerful code among the above-listed codes in terms of error correction capability. This code can correct 15 random error bits within a codeword of 63 bits although incurring the cost of including more redundant bits. However, as a result, BCH (63,7,15) has the smallest data embedding capacity of the above-listed codes.

In some images, blocks having erroneous data may be present in disproportionate numbers in certain concentrated areas, which could cause a single codeword to include a number of errors that exceeds the error-correction power even of BCH (63,7,15). To combat this type of error "burst" which could cause some embodiments of the disclosed data embedding system and method to fail, the error code correction algorithm is preferably combined with a permutation scheme. This has been stated in S. B. Wicker, *Error Control System for Digital Communication and Storage*, Englewood Cliffs, N.J.: Prentice-Hall, 1995 (referred to herein as "Wicker"), which document is hereby incorporated herein by reference. As disclosed in Wicker, combining error correction coding and permutation is an effective and efficient strategy for efficiently combating both random error and bursts of errors. For the sake of security, the message bits are preferably permuted using a secret key in the proposed algorithm. In one alternative embodiment, the permutation may be performed employing a chaotic mixing technique by G. Voyatzis and I. Pitas, "Chaotic mixing of digital images and applications to watermarking," proceedings of *European Conference of Multimedia Applications, Services Techniques* (ECMAST'96), 2, pp. 687-695, May 1996.

Figure 15:
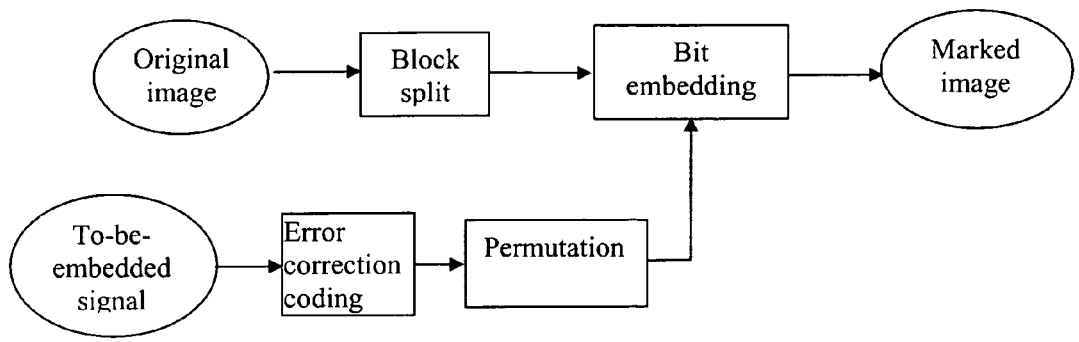
FIG. 15 is a block diagram illustrating a method for embedding data in an image in accordance with one or more aspects of the present invention.

FIG. 15 is a block diagram illustrating a preferred embodiment of the above-described system and method for embedding data into an image. The process of data extraction is preferably the reverse of that of data embedding. For a given marked image, the image is preferably first split into non-overlapping blocks. Then, the block difference value $\alpha$ is preferably calculated for each block.

Figure 16:
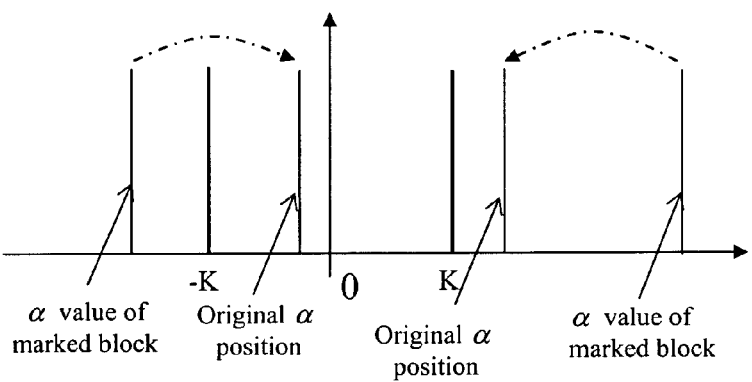
FIG. 16 is a graph illustrating the change in magnitude of a block difference value arising from extracting a bit from a block for a situation in which the absolute value of the block difference value α is greater than the absolute value of the threshold K, in accordance with one or more aspects of the present invention.

If the absolute value of the block difference value $\alpha$ for a block undergoing data extraction is larger than the absolute value of the threshold K, the extraction method then preferably examines the grayscale value distribution of the block. If the block is identified as fitting the profile of category 4, case 2, a logical-0 bit value is preferably extracted from the block, and the block is left unchanged. Otherwise, a logical-1 bit value is extracted from the block, and the block difference value $\alpha$ is shifted back towards the zero point by an amount corresponding to the value of the shift quantity $\beta$. Specifically, if $\alpha$ is negative, the shift toward zero corresponds to adding the shift quantity $\beta$ to $\alpha$. If $\alpha$ is positive, the shift toward zero corresponds to subtracting the shift quantity $\beta$ from $\alpha$. Performing the above steps preferably causes the pixel values (whether grayscale or other type of pixel value) to revert back to their original values, as shown in FIG. 16.

If the absolute value of the block difference value $\alpha$ is less than the threshold K, then a logical-0 bit value is extracted from the block. In this situation, the pixel values of the block are preferably left unchanged. In a preferred embodiment, when the marked image is processed as described above, all pixels will end up with the same pixel values that they had in the original image.

Figure 17:
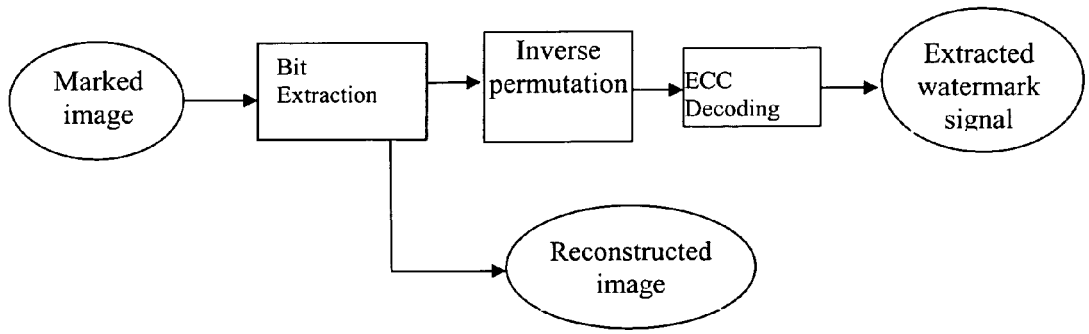
FIG. 17 is a block diagram illustrating a method for extracting data from an image in accordance with one or more aspects of the present invention.

With reference to FIG. 17, in a preferred embodiment, after data extraction, the inverse permutation and the ECC decoding are preferably performed, thereby causing the original information bits that were embedded into the image to be precisely recovered. Moreover, the original image can also preferably be recovered without any distortion. A preferred embodiment of the extraction method is illustrated in FIG. 17.

A preferred embodiment of the inventive system and method has been successfully applied to commonly used grayscale images such as 'Lena', 'Baboon', etc., eight medical images, eight JPEG2000 color test images, and all 1096 images in the CorelDraw™ image database. For color images, the method is preferably applied to only one color plane of each image. The results demonstrate an absence of salt and pepper noise owing to the fact that the preferred method does not employ modulo-256 addition.

In a preferred embodiment, the data embedding capacity (the amount data that can be stored in an image) can be more than 512 or 1024 bits for the purpose of authentication, and it can be adjusted by changing the block size for other applications.

As discussed later in this document, the PSNR obtained employing a preferred embodiment of the present invention is much higher than that obtained by using the method in C. De Vleeschouwer, J. F. Delaigle and B. Macq, "Circular interpretation of bijective transformations in lossless watermarking for media asset management," *IEEE Tran. Multimedia*, vol. 5, pp. 97-105, March 2003 (referred to herein as "De Vleeschouwer").

There is generally a tradeoff between data embedding capacity and PSNR. Thus, in a preferred embodiment, various parameters, such as the selection of BCH codes, may be selected to achieve an optimal resulting combination of PSNR and data embedding capacity. The tested images can resist the JPEG/JPEG2000 compression with the surviving bit rate ranging from 2.0 bpp (bits per pixel) to 0.2 bpp. In other words, the hidden data can be retrieved without error when image compression is applied to marked images, with the resultant bit rate in the units of bpp equal to or greater than the above-mentioned surviving bit rate.

FIGS. 18-20 illustrate sets of original images and images marked employing a preferred embodiment of the system and method of the present invention. Note that no visible artifacts exist in the marked images, thereby indicating a significant performance improvement over the prior art.

FIGS. 21-24 summarize the test results for three sets of commonly used images, respectively: 1) three commonly used images, i.e., Lena, Baboon, and Boat; 2) 1096 images in the CorelDraw™ database; 3) eight medical images; and 4) eight JPEG2000 test images. In the following, the "block size" represents the number of pixels along one side of a square block, and the "embedding level" denotes the amount of grayscale value change within the block that is needed for a logical-1 bit value to be embedded into the block. Note that the values of the block size and the embedding level have been selected so as to make the results presented FIGS. 23-24 suitable for comparison with those obtained in De Vleeschouwer. In order to compare the performance between the modulo-256 based algorithm and the preferred-embodiment algorithm in a more accurate way, we have conducted a set of experiments on the eight medical images with the comprehensive test results shown in FIG. 25. In this set of experiments, we changed the block size and the embedding level to observe the embedding capacity, the PSNR of marked images versus original images, and the robustness against image compression.

In order to make comparison accurate, the description of De Vleeschouwer was followed to embed 100 information bits into an image. When the number of blocks and hence the embedding capacity is large, we repeatedly embed the same 100 information bits. After hidden data extraction, we used majority voting to decode the hidden information bits. Therefore, in a preferred embodiment, for each given block size, the embedding capacity for the preferred-embodiment method and the De Vleeschouwer method are the same.

The disparity between the PSNR of a marked image and the corresponding original image depends on the embedding level employed in the marking process. This PSNR disparity also depends on the block size used for embedding data in the image. This is because as block size increases, the variance of the block difference value $\alpha$ throughout the block decreases. This decrease in the value $\alpha$ preferably permits smaller values for the threshold value K and for the shift quantity $\beta$ to be employed.

With reference to FIG. 25, the PSNR values of the eight marked images generated by using one method are averaged and listed in FIG. 26 for each combination of block size and embedding level. The robustness in terms of minimum surviving bit-rate is listed in FIG. 25. The average bit rates (robustness) for each combination of block size and embedding level are listed in FIG. 26. Furthermore, the PSNR and the robustness are also averaged over different embedding levels for a given block size (marked by *), as well as over different block sizes (marked by **), are also shown in FIG. 26. It is observed from FIG. 26 that for each combination of block size and embedding level, hence, each specified data embedding capacity, the average PSNR over eight marked medical images using the preferred-embodiment method is much higher than that using the algorithm in De Vleeschouwer. It is also observed that for each combination the average minimum surviving bit rate associated with the proposed method is lower than that with the algorithm in De Vleeschouwer. Consequently, the average robustness against image compression with the preferred-embodiment method disclosed herein is stronger than that with the De Vleeschouwer algorithm, thereby providing superior performance superior to that available in the prior art.

A novel robust lossless image data hiding system and method scheme is disclosed herein, which system and method preferably employ a robust statistical quantity to mitigate the effects of image compression and small incidental alteration on a data embedding process. The system and method preferably employ different bit-embedding strategies for groups of pixels with different pixel grayscale value distributions. The system and method preferably employ error correction coding in combination with a permutation scheme to address the occurrence of individual error bits and excessive concentrations of such error bits, respectively.

A preferred embodiment of the system and method disclosed herein presents the following benefits: 1) an absence of salt-and-pepper noise; 2) applicability to virtually all images (the algorithm has been successfully tested on a wide variety of images); 3) an average PSNR of marked images above 38 dB; 4) robustness to JPEG/JPEG2000 compression; 5) data embedding capacity can be higher than 512 bits or 1024 bits (often sufficient for authentication purposes), and the ability to adjust the embedding capacity as needed.

The system and method disclosed herein can be employed to embed digital-signature related data to authenticate losslessly compressed JPEG2000 images, followed by possible transcoding. The unified authentication framework may provide both fragile and semi-fragile authentication. The former is for data integrity verification, while the latter is for content integrity verification. Furthermore, there may be both lossy and lossless modules in semi-fragile authentication. The robust lossless data hiding scheme reported here is used for the lossless module. Specifically, if a losslessly compressed JPEG2000 image has not been altered before authentication, the hidden data can be accurately extracted. Moreover, the image can be classified as authentic, and the original image can be recovered exactly.

If the losslessly compressed JPEG2000 image has experienced further transcoding, such as with lossy compression, the image will be deemed authentic as long as the compression is not so severe that the content has been changed. In this situation, the hidden data can be accurately extracted, but it will generally not be possible to recover the original image. If the lossy compression is so severe that the resultant bit rate is lower than the specified minimum surviving bit rate, the hidden data will not be extracted correctly, and the image will be rendered non-authentic.

If the content of a losslessly compressed image has been altered, then the hidden data may not be able to be extracted without error. Moreover, even if the hidden data can still be extracted out correctly, the extracted data will cause the image itself to be deemed inauthentic because of the mismatch between the extracted data (which reflects the original image) and the data derived from the content-altered image. More information can be found in documents [15[ and [16] below.

The following documents are hereby incorporated herein by reference.

[1] Y. Q. Shi, Z. Ni, D. Zou, C. Liang and G. Xuan, "Lossless data hiding: Fundamentals, algorithms and applications," *Proceedings of IEEE International Symposium on Circuits and Systems*, vol. II, pp. 33-36, Vancouver, Canada, May 2004.

[2] C. W. Honsinger, P. Jones, M. Rabbani, and J. C. Stoffel, "Lossless recovery of an original image containing embedded data," U.S. Pat. No. 6,278,791, 2001.

[3] J. Fridrich, M. Goljan and R. Du, "Invertible authentication," *Proc. SPIE Photonics West, Security and Watermarking of Multimedia Contents III*, Vol. 397, pp. 197-208, San Jose, Calif., January 2001.

[4] M. Goljan, J. Fridrich, and R. Du, "Distortion-free data embedding," *Proceedings of 4th Information Hiding Workshop*, pp. 27-41, Pittsburgh, Pa., April 2001.

[5] G. Xuan, J. Zhu, J. Chen, Y. Q. Shi, Z. Ni, W. Su "Distortionless data hiding based on integer wavelet transform," *Proceedings of IEEE International Workshop on Multimedia Signal Processing*, St. Thomas, US Virgin islands, December 2002. IEE Electronics Letters, vol. 38, no. 25, pp. 1646-1648, Dec. 2002.

[6] Z. Ni, Y. Q. Shi, N. Ansari and W. Su, "Reversible Data Hiding," *Proceedings of IEEE International Symposium on Circuits and Systems*, Bangkok, Thailand, May 2003.

[7] M. Celik, G. Sharma, A. M. Tekalp, E. Saber, "Reversible data hiding," in *Proceedings of the International Conference on Image Processing* 2002, pp. 157-160, Rochester, N.Y., September 2002.

[8] J. Tian, "Reversible data embedding using a difference expansion," *IEEE Transaction on Circuits and Systems for Video Technology*, vol. 13, no. 8, pp. 890-896, August 2003.

[9] C. De Vleeschouwer, J. F. Delaigle and B. Macq, "Circular interpretation of bijective transformations in lossless watermarking for media asset management," *IEEE Tran. Multimedia*, vol. 5, pp. 97-105, March 2003.

[10] W. Bender, D. Gruhl, N. Morimoto and A. Lu, "Techniques for data hiding," IBM *Systems Journal*, vol. 35, no. 3-4, pp. 313-336, 1996.

[11] J. G. Proakis, *Digital communication*, 4th edition, McGraw-Hill 2000.

[12] S. B. Wicker, *Error Control System for Digital Communication and Storage*, Englewood Cliffs, N.J.: Prentice-Hall, 1995.

[13] Z. Ni, Y. Q. Shi, N. Ansari, W. Su, Q. Sun and X. Lin, "Robust lossless image data hiding," *Proceedings of IEEE International Conference on Multimedia and Expo*, Taipei, Taiwan, June 2004.

[14] G. Voyatzis and I. Pitas, "Chaotic mixing of digital images and applications to watermarking," proceedings of European Conference of Multimedia Applications, Services Techniques (ECMAST'96), 2, pp. 687-695, May 1996.

[15] Z. Zhang, Q. Sun, X. Lin, Y. Q. Shi and Z. Ni, "A unified authentication framework for JPEG2000 images," *Proceedings of IEEE International Conference on Multimedia and Expo*, Taipei, Taiwan, June 2004.

[16] Information Technology—JPSEC Commission Draft (Version 2.0), ISO/IEC JTC I/SC29/WG1 N3397, September 2004.

Authentication

JPEG2000 (Joint Photographic Experts Group 2000) has many advanced features, including lossy to lossless compression, an improved compression ratio, resolution scalability, quality scalability, ROI (Regions Of Interest) among others. Therefore, these factors should be borne in mind when designing an authentication system intended for use with JPEG2000 images. It will be appreciated that the inventive principles discussed herein may be employed with image data storage formats other than JPEG2000.

The authentication system and method are preferably able to exploit advanced features of JPEG2000. For instance, the system and method should be able to protect the JPEG2000 image in a scalable way. To align with JPEG2000, the system and method should be able to protect any one or more components, tiles, resolutions, quality layers, ROIs, precincts, or code blocks. The authentication framework is preferably able to provide effective and secure protection for JPEG2000 images while being robust enough to avoid losing a status of authenticity of embedded data even when incidental distortion of the data occurs. The authentication framework is preferably not obtained in a way that either compromises advanced features of JPEG2000 or that narrows its typical applications. For instance, a solution should retain the lossless-compression feature of JPEG2000 images. The authentication framework should be compatible with state-of-the-art information security standards such as X.509 and the like.

Authentication is a process for protecting integrity of data and to prevent repudiation. Generally, it includes a signing process and a verification process. A digital signature is a tool for data authentication. Generally speaking, it should include some data (i.e., the signature) that the receiver can use as evidence that a particular message was sent and that the signer was the originator. Signing is the process of generating a signature for the protected data. Verification is the process of detecting corruption of protected data or of confirming that data is correct. A hash generally refers to a one-way function in cryptography. Typical hash functions are MD-5 and SHA-1.

L.A.B.R. (Lowest Authentication Bit Rate) refers to the authentication strength. in Z. Zhang, Q. Sun, X. Lin, Y. Q. Shi and Z. Ni, "A unified authentication framework for JPEG2000 images," Proceedings of IEEE International Conference on Multimedia and Expo, Taipei, Taiwan, June 2004, which document is incorporated herein by reference. As long as the bit-rate of the re-coded or transcoded JPEG2000 is greater than the LABR, its authenticity is guaranteed by the system and method disclosed herein.

With Fragile Authentication, protection is based on image data instead of image content. Even a one-bit modification within the protected image data will make the image unauthentic, even if it doesn't change its content meaning. With Lossy Authentication, protection is based on image content. Lossy Authentication is robust against the defined incidental distortions by watermarking the content in a lossy way. With lossless authentication, protection is also based on image content, and it is also robust against the defined incidental distortions. However, it can recover the original image after watermark extraction, if no transcoding is applied.

Incidental distortion is generally introduced by common image processing and unreliable network transportation. Normally, incidental distortion doesn't change the image meaning, but it may degrade the image quality. Intentional distortion is generally introduced by some kind of malicious attack, which changes the meaning of image content. Intentional distortion is generally introduced by some kind of malicious attack, which changes the meaning of the image content. Lossy watermarking will generally permanently cause the degradation of image quality, though it is imperceptible.

Lossless watermarking will cause the degradation of image quality, though it is generally imperceptible. However, the original content can be exactly recovered after watermark extraction, if no transcoding is applied on the watermarked JPEG2000 image.

Parity Check Bits (PCB) refer to the redundancy bits included in data storage and/or data transmission in order to detect and correct errors. The term "attack" generally corresponds to (in robust authentication (lossy or lossless)), any content modifications which result in a change of content meaning. In fragile authentication, any one-bit change will generally be considered to be an attack. The foregoing terms are not limited to the descriptions provided above.

Functionalities

The proposed system integrates fragile authentication, lossy authentication, and lossless authentication in one single unified framework for JPEG2000 images. However, the principles disclosed herein may be employed with other image data storage formats. Similar to JPEG2000 compression strength that is quantitatively controlled by the compression bit-rate, the authentication strength could also be quantitatively specified by a parameter called "Lowest Authentication Bit Rate (LABR)". It means that all data/content of JPEG2000 image above LABR will be protected, which is very convenient for users of such a system.

Fragile authentication is preferably used to protect one or more parts of a codestream, or even the whole codestream from the main header to EOC (End of Context) marker. Since it's fragile, any one-bit modification of the protected part will make the image unauthentic. Lossy authentication is used to protect a JPEG2000 image in a semi-fragile way, which is much more robust to incidental distortion. The image quality after lossy authentication degrades to an imperceptible degree, due to watermark embedding. Similarly, lossless authentication also protects JPEG2000 images in semi-fragile way, but the original image can be recovered after watermark extraction, assuming no transcoding is applied. Typical functionalities of the proposed system are listed below.

Fragile Authentication.

In fragile authentication mode, a JPEG2000 image can be protected in various granularities, including the following: protecting the whole code stream; protecting a part of the code stream pertaining to one or more tiles; protecting a part of the code stream pertaining to one or more components; protecting part of the code stream pertaining to one or more resolution levels; protecting a part of the code stream pertaining to one or more quality layers, defined by LABR. protecting a part of the code stream pertaining to one or more precincts; protecting a part of the code stream pertaining to one or more code blocks; protecting a part of the code stream pertaining to one ROI.

Lossy Authentication.

With lossy authentication, a digital signature can survive incidental distortion arising from actions like transcoding and multiple cycles of JPEG2000 encoding and decoding. However, if image content is intentionally modified, meaning that content meaning is changed, it will not be able to pass the verification process. As indicated by its name, it is lossy in the sense that image quality imperceptibly degrades after watermark embedding.

Similarly, the image can be provided with the following granularities of protection:
the whole image content; the image content of one or more quality layers, defined by LABR; the image content of one or more tiles; the image content of one or more components; the image content of one or more ROIs; the image content of one or more resolutions; the image content of one or more precincts; the image content of one or more code blocks.

In addition, with lossy authentication, it is possible to allocate (localize) the attacked area, should the image be maliciously manipulated.

Preferably, lossless authentication goes one step further. Lossless authentication can recover the original image after watermark extraction (if no transcoding is applied). If transcoding is applied, the original image generally may not be recovered. However, the transcoded image can still be verified as authentic so long as the bit rate of the transcoded image is above the LABR. Lossless authentication also provides robustness against incidental distortions. With lossless authentication, it is also able allocate the attacked area.

The image can be protected with the following granularities: the whole image content; the image content of one or more quality layers, defined by LABR; the image content of one or more tiles; the image content of one or more components; the image content of one or more ROIs; the image content of one or more resolutions; the image content of one or more precincts; the image content of one or more code blocks.

General Description

Figure 27:
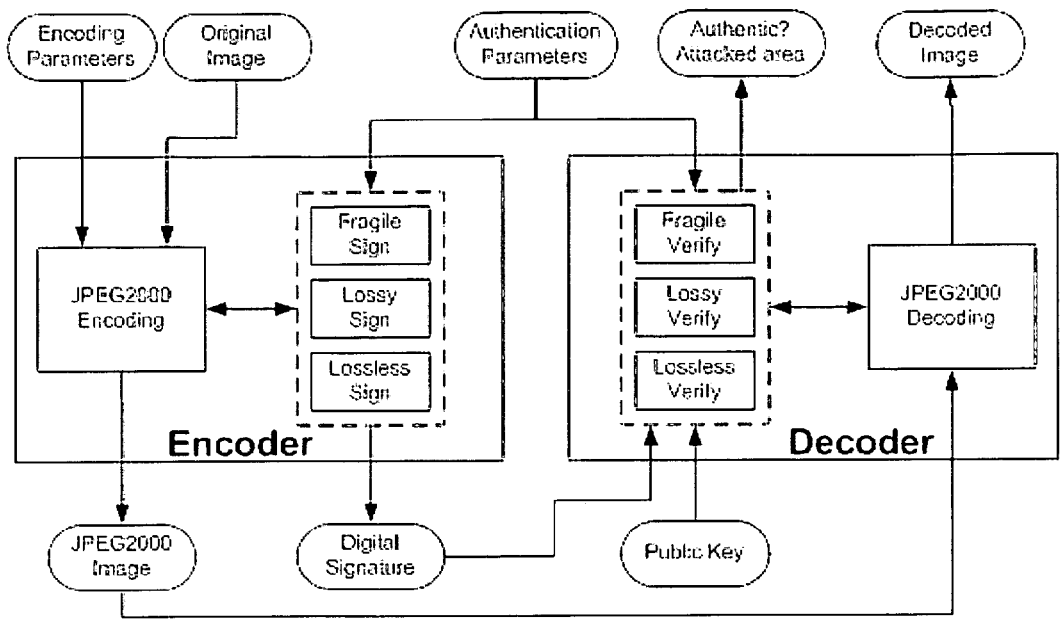
FIG. 27 is a block diagram illustrating a system and method for image authentication according one or more aspects of the present invention.

FIG. 27 illustrates a proposed system for JPEG2000 image authentication in accordance with one or more aspects of the present invention. The left part is the encoder and the right part is the decoder. The encoder accepts three sets of parameters, including encoding parameters (such as CBR, 5/3 filter or 9/7 filter, etc), an original image to be encoded, and authentication parameters (such as LABR, protected locations, and an authentication mode).

Depending on the specified authentication mode, a different authentication module will be invoked while the image is being encoded. If fragile authentication is specified, the "fragile sign" module is invoked to generate the digital signature, which is a straightforward solution with traditional crypto signature. If lossy authentication is specified, the "lossy sign" module is invoked to embed a watermark into the image and generate a digital signature, which is preferably more robust to incidental distortions. If lossless authentication is specified, the "lossless sign" module is invoked to embed a watermark into the image and generate a digital signature, such that after signature verification, the image content can be exactly recovered, if no transcoding is applied. If transcoding has been applied to the image, the JPEG2000 image can still be verified but cannot be exactly recovered. In this case, the final outputs of the system and method are a JPEG2000 image (without watermark for fragile authentication and with watermark for lossy & lossless authentication) and its associated digital signature.

In the reverse direction, a decoder accepts four inputs: a JPEG2000 image to be decoded, a digital signature, a public key and authentication parameters. In manner similar to that described in connection with the encoder of FIG. 27 above, the specified authentication mode preferably determines which verify module (fragile verify, lossy verify or lossless verify) will be invoked while the image is being decoded. The final outputs of the decoder are the decoded image, verification status and information about the attacked areas (where the image has been maliciously manipulated). Note that after lossless verification, the decoded image will be exactly the same as the original image.

Fragile Authentication

Figure 28:
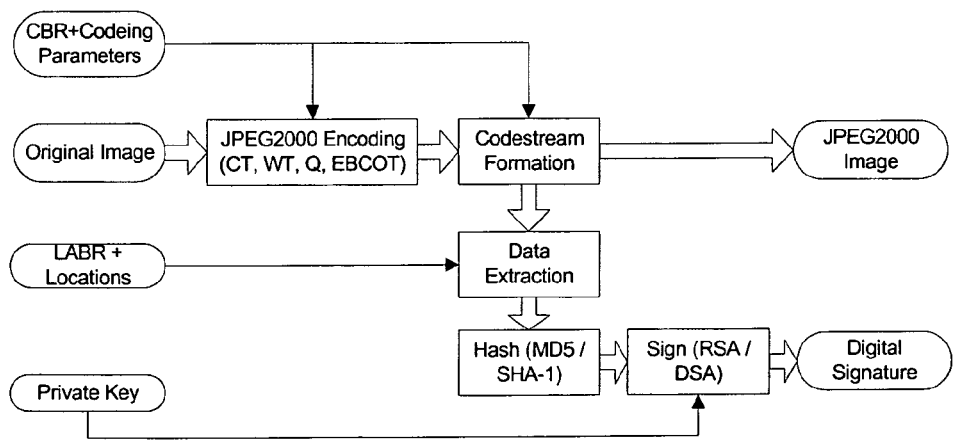
FIG. 28 is a block diagram illustrating a method for generating a digital signature employing a fragile authentication mode in accordance with one or more aspects of the present invention.
Figure 29:
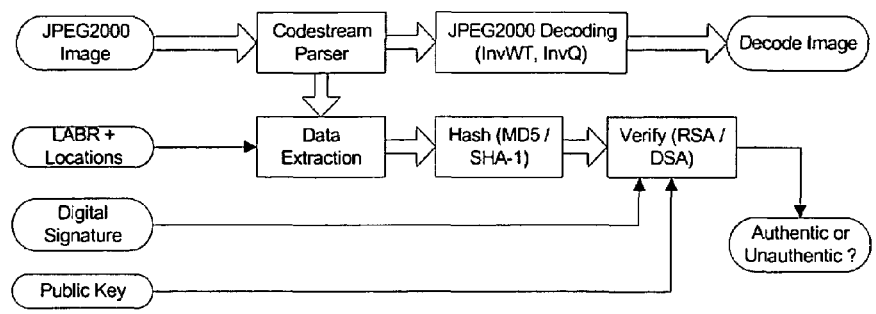
FIG. 29 is a block diagram illustrating a method for verifying a digital signature employing a fragile authentication mode in accordance with one or more aspects of the present invention.

Fragile authentication is selected for protecting JPEG2000 image on a code-streams level. Fragile signing and verifying operations are quite straightforward, as shown in FIGS. 28 and 29. During the sign operation (FIG. 28), the original image is encoded according to a conventional procedure. While the code stream is being formulated, its protected parts, as specified by LABR and other parameters, are extracted and fed to a conventional hashing and signing operations. Consequently, a digital signature is preferably generated. During the verify operation (FIG. 29), while the code stream is parsed during decoding, its protected part, as specified by LABR and other parameters, is extracted and fed to conventional hashing and verifying operations, which return the verification result as "authentic" or unauthentic." Even a one-bit change in the protected part will cause the recovered data to deemed unauthentic.

Lossy Authentication

Figure 30:
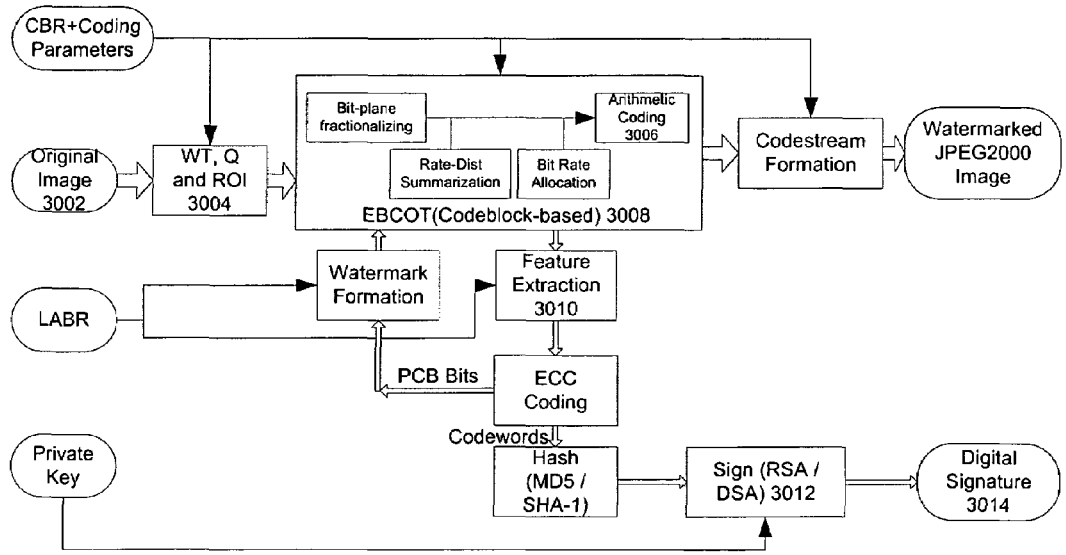
FIG. 30 is a block diagram illustrating a method for generating a digital signature employing a lossy authentication mode in accordance with one or more aspects of the present invention.

Lossy authentication is usually selected for those applications in greater need of robustness such as wireless communication. FIG. 30 illustrates a lossy signing operation in accordance with one or more aspects of the present invention. First, the original image 3002 preferably undergoes color and wavelet transformation and quantization 3004, arithmetic coding 3006 and EBCOT (Embedded Block Coding with Optimized Truncation) 3008, which are all basic procedures in JPEG2000 encoding. The EBCOT 3008 process preferably determines, for each coded block, those bit-planes that are above LABR (i.e., they survive transcoding operation to LABR). Then, a decision is made on which resolution level (X) is suitable for feature extraction 3010 and which resolution level (Y) for watermark embedding, based on Human Vision System (HVS). The block-based feature, $F_i$, is then encoded with selected Error Correction Coding (ECC) Scheme to generate codeword $CW_i$. The Parity Check Bits of $CW_i$, $PCB_i$, is used as a seed to formulate block based watermark $W_i$, which is then embedded into the corresponding block in LH or HH subband of Y.

Additionally, features from all blocks are concatenated and the resulted bit sequence is preferably hashed by a cryptographic hashing function such as MD5 or SHA-1. The generated hash value is then preferably signed 3012 using the content sender's private key to form the crypto signature 3014.

Figure 31:
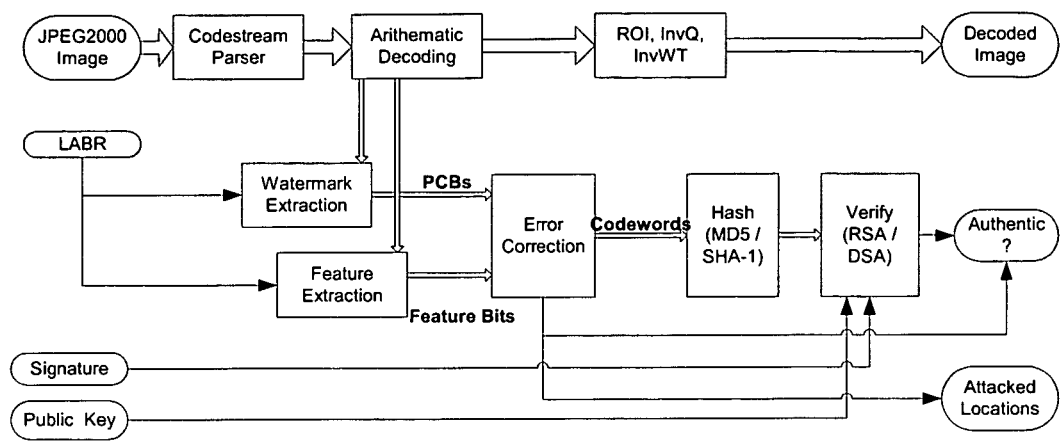
FIG. 31 is a block diagram illustrating a method for verifying a digital signature employing a lossy authentication mode in accordance with one or more aspects of the present invention.

FIG. 31 illustrates a lossy verifying operation in accordance with one or more aspects of the present invention. The codestream parser preferably determines, for each block, those bit planes above LABR. Based on this determination, we can decide the resolution level X for feature extraction and resolution Y for watermark extraction. Block-based feature extraction is preferably the same as that used in the lossy signing operation of FIG. 30. A block-based watermark is extracted from each block in resolution Y. Note that if the input image is not in JPEG2000 format, the watermark and features are preferably obtained employing an operation which is the same as that used in the signing operation.

Then, combining features and PCBs (parity check bits) from each block forms a codeword, and the whole verification decision could be made orderly. First, we calculate the syndrome of the codeword for each block to see whether any blocks are uncorrectable. If any blocks are uncorrectable, then the image is deemed unauthentic, and those blocks with uncorrectable codewords are considered to be attacked areas. However, if all codewords are correctable (i.e. errors in any feature code are correctable by its PCB), all corrected codewords are concatenated into a bit sequence, which is then cryptographically hashed. The final verification result is concluded through a cryptographic verifying operation using a supplied signature and a public key.

Lossless Authentication

Figure 32:
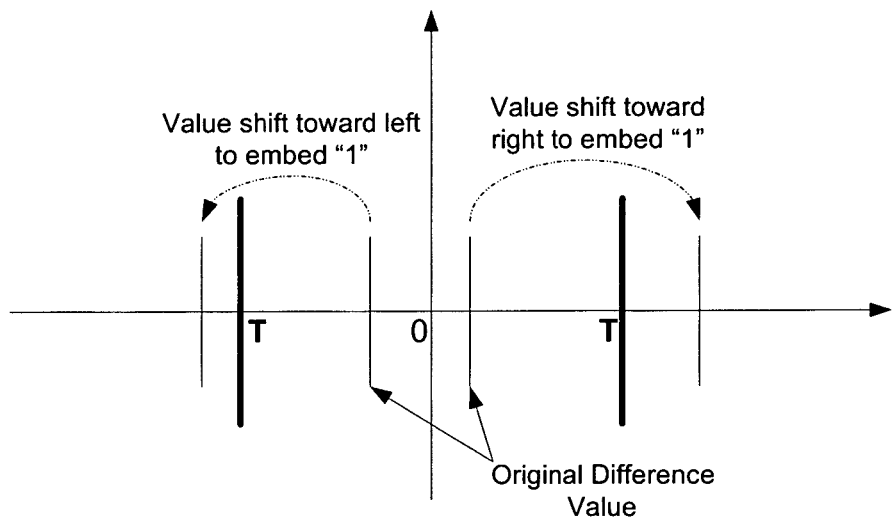
FIG. 32 is a graph illustrating the change in magnitude of a block difference value arising from the embedding of a bit into a block of an image in accordance with one or more aspects of the present invention.

The lossless mode is preferably selected for medical or remote imaging related applications where lossless recovery of the watermarked image is needed. The lossless signing operation is very similar to lossy signing operation (FIG. 30). The only difference lies in watermark embedding module. We consider a code block of 64×64 pixels divided into 8×8 blocks, called patches. The pixel values in a patch are split into two subsets. Then we calculate the block difference value $\alpha$ for the patch, which is defined as the arithmetic average of differences of pixel values in two respective subsets. Since in a patch, the coefficients are highly correlated, the patch difference value $\alpha$ is expected to be very close to zero. Furthermore, it has certain robustness against incidental distortions because $\alpha$ is based on all pixel values in the patch. Each patch is preferably embedded with one bit, as illustrated in FIG. 32. If a logical-1 bit is to be embedded, we shift block difference value $\alpha$ to the right side or to the left side beyond a threshold, by adding fixed number (a shift quantity) to each pixel value, or subtracting the fixed number from each pixel value, within one subset. If a logical-0 bit is to be embedded, the patch is left unchanged. There are situations in which the block difference value $\alpha$ for a patch exceeds the value of the threshold without the addition of a shift quantity, and in which a logical-0 bit is to be embedded. In this case, we shift the block difference value $\alpha$ further away beyond the threshold and rely on error-correction coding to correct the resulting bit error. It is noted that the watermark bits are ECC encoded again before being embedded.

As with the signing operations, the lossless verifying operation is also similar to the lossy verifying operation, with the exception of watermark extraction. The code block is divided into patches, and a block difference value $\alpha$ of each patch is calculated in the same way as the lossless signing operation. For each patch, if block difference value $\alpha$ is beyond the threshold, a bit of "1" is extracted, and the block difference value $\alpha$ is shifted back to its original position, which means that original pixel values are recovered. If the block difference value $\alpha$ is below the value of the threshold, a bit of "0" is extracted and the block difference value $\alpha$ is left unchanged. Finally error code correction is preferably applied on the extracted bit sequence to get the correct watermark bits.

Digital Signature

Figure 33:
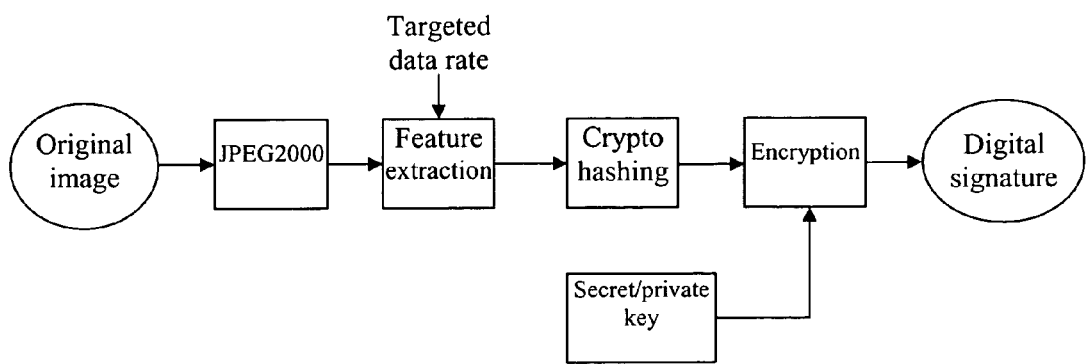
FIG. 33 is a block diagram illustrating a method for embedding data representing a digital signature produced from a content feature in an image in accordance with one or more aspects of the present invention.

In one embodiment, the data to be embedded in an image is a digital signature. This digital signature may be produced from a content feature within an image. Preferably, the content feature is first extracted from the image, and then a one way hash function and private/public key encryption are preferably employed to generate a digital signature from the image content feature. The digital signature may be 512 bits long or 1024 bits long. However, in other embodiments, digital signatures may have lengths of various lengths both less than or greater than 512 bits. A preferred embodiment of this process is shown in FIG. 33. In a preferred embodiment, the digital signature is embedded into the original image according to the lossless data hiding algorithm, discussed above, to get the watermarked image.

Figure 34:
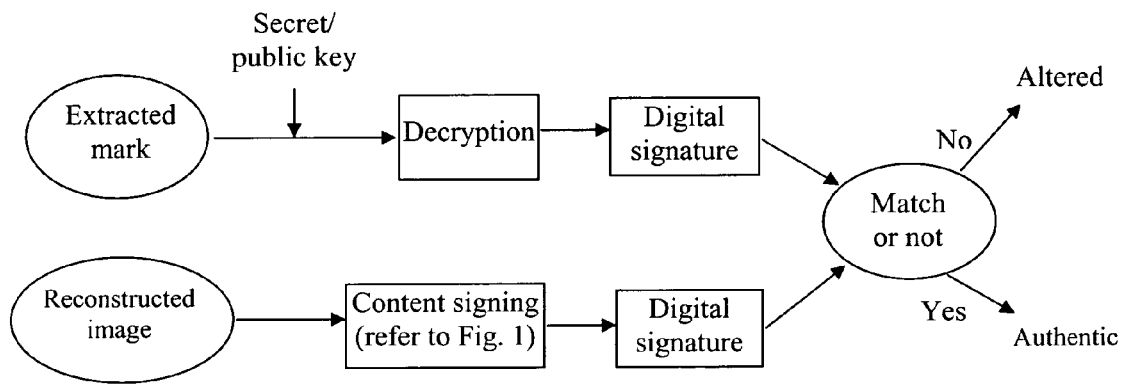
FIG. 34 is a block diagram illustrating a method for authenticating a digital signature in accordance with one or more aspects of the present invention.

FIG. 34 is a block diagram illustrating an authentication process for a digital signature in accordance with one or more aspects of the present invention. Preferably, the extracted mark and the reconstructed image are obtained from the watermarked image according to the extraction technique described elsewhere in this document. Preferably, if the image has been altered, the authentication process can be used to check which local part of the image has been changed. If the local extracted bit does not match the produced signature bit, the method preferably concludes that the block has been changed.

Preferably, the novel, robust, distortionless image data-hiding technique disclosed herein has certain robustness to JPEG and JPEG2000 compression. One or more aspects of the data embedding system and method disclosed herein preferably present certain advantages over existing robust distortionless data hiding techniques. These advantages may include an absence of salt-and-pepper noise, which arose in prior methods due to modulo 256 addition. One or more aspects of the system and method disclosed herein may be applicable to a wide range of commonly used images (including medical images and more than one thousand images in the CorelDRAW™ database and all JPEG2000 test images).

One or more embodiments of the system and method disclosed herein provide an average PSNR of marked images which is above 37 dB, are robust to JPEG2000 or JPEG compression to a certain extent. One or more embodiments of the system and method disclosed herein can provide a data embedding capacity of 1024 bits or 512 bits for JPEG2000 test images. One or more embodiments of the system and method disclosed herein may be used for image authentication and for semi-robust integrity verification.

System Analysis

This section elaborates more on algorithmic complexity, storage overhead, data expansion, and the impact of transmission error and security analysis for one or more embodiments of the date embedding and recovery system and method disclosed herein.

Complexity

For a fragile sign and verify operation, the processing overhead employs about 5% of standard JPEG2000 encoding/decoding time. This computational burden is incurred mostly by: finding, from the code stream, the protected segment that is specified by the LABR and by the location parameters, and extracting this protected segment from the code stream. These steps can preferably be performed while the code stream is being formulated, thereby minimizing the processing overhead for the steps. The processing overhead may also include performing one hash (MD5/SHA-1) operation on the extracted part of the code stream and performing one RSA/DSA sign or verify operation.

For lossy and lossless operations, the process overhead is around 20% of standard JPEG2000 encoding/decoding processing time. This processing overhead may include the following operations: identifying all bit-planes above LABR, in order to decide where to extract a feature and where to embed/extract the watermark. The processing overhead may further include: extracting features from each protected code block, ECC coding or correction for each protected code block, watermark embedding or extraction, one hash operation, one RSA/DSA sign or verify operation, and storage overhead.

In a preferred embodiment, for fragile sign and verify operations, the only overhead comes from the fact that the protected part of code stream needs to be temporarily stored in memory in order to sign and verify. For example, for a 500 KB image, the maximum memory overhead is 500 KB.

For lossy and lossless authentication operations, the quantized coefficients in a current tile are preferably temporarily stored in memory in order not to avoid repeating wavelet and quantization steps. In this case, the overhead requirement generally depends on the size of a tile. For example, if the tile size is 256×256, the overhead will be around 1 MB.

Data Expansion

For fragile authentication, the overhead is only side information, such digital signature data, protected location information, public key information and the like. In one embodiment, the space needed for the foregoing is about 300 bytes. The resulting code stream is preferably the same as with normal encoding. For lossy and lossless authentication, the overhead space needed for side information is preferably the same as for fragile authentication. The resulting code stream size is about 0 to 200 bytes more or less than that for a normal encoded code stream.

Impact of Transmission Error

In one embodiment, for fragile authentication, any transmission error will result in failure of verification, due to the nature of traditional crypto signature. In one embodiment, for lossy and lossless authentication, as long as the number of error bits is not significant, the system and method disclosed herein can still authenticate the image, due to the robustness of our solution.

Security Analysis

In one embodiment, for fragile authentication, the security strength is the same as that of the underlying Hash (MD5 or SHA-1) and Sign (RSA or DSA) algorithms. However, for lossy and lossless authentication, content-based feature extraction and error correction coding (ECC) may reduce the security strength, as some modifications may not affect the extracted features, and some of the modified features may be changed by ECC. However, this security risk can be compensated for with image contextual characteristics.

A preferred embodiment of the system and method disclosed herein provides a systematic and quantitative way for authenticating multimedia content by casting the content into a finer representation in terms of authentication bit rate. This makes authentication applications more convenient for the user by simply keying in one parameter, specifically, the authentication bit-rate to protect the content.

A preferred embodiment of the system and method disclosed herein provides a framework for meeting different authentication requirements from real applications by employing different signing modules (fragile, lossless and lossy) which are consistent with different JPEG2000 coding settings. The preferred system and method are preferably fully compatible with JPEG2000 coding and traditional cryptography schemes. Moreover, the preferred system and method are preferably well suited to and needed by JPSEC tools.

The following documents are hereby incorporated herein by reference.

1) Z. Zhang, Q. Sun, X. Lin, Y. Q. Shi and Z. Ni, "A unified authentication framework for JPEG2000 images," Proceedings of IEEE International Conference on Multimedia and Expo, Taipei, Taiwan, June 2004.
2) Information Technology—JPSEC Commission Draft (Version 2.0), ISO/IEC JTC 1/SC29/WG1 N3397, September 2004.
3) Zhishou Zhang, Gang Qiu, Qibin Sun, Xiao Lin, Zhicheng Ni, Yun-Qing Shi, WG1N3074 "A Unified Authentication Framework for JPEG2000 images: System Description and Experiment Results"
4) Qibin Sun, Xiao Lin and Yun-Qing Shi, WG1N2946 "A Unified Authentication Framework for JPEG2000 images"

5) Touradj Ebrahimi and Claude Rollin, WG1N30555 "JPSEC Working Draft—Version 2.0".

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    identifying at least two subsets of pixels within a block of an image;
    forming a plurality of pixel groups from said at least two subsets of pixels, each said pixel group having at least one pixel from a first of said at least two subsets and at least one pixel from a second of said at least two subsets;
    producing a plurality of difference values, each said pixel group providing one of said difference values, each said difference value being based on differences between pixel values of pixels within one of said pixel groups; and
    modifying pixel values of pixels in less than all of said at least two subsets, thereby embedding a bit value into said block; and
    calculating a block difference value for said block of said image, said block difference value being equal to an average of said plurality of difference values.

2. The method of claim 1 wherein said less than all subsets consists of only one subset.

3. The method of claim 1 wherein said modifying causes a logical-1 bit value to be embedded into said block.

4. The method of claim 1 further comprising:
    identifying a contrast status of said block; and
    customizing said modifying according to said contrast status.

5. The method of claim 4 wherein said identifying said contrast status comprises:
    identifying a status of a histogram of said block.

6. The method of claim 5 wherein said identifying said contrast status comprises:
    identifying a block difference value for said block, said block difference value being equal to an arithmetic average of said difference values.

7. The method of claim 4 further comprising:
    employing error correction coding to correct any bit errors in said block.

8. The method of claim 1 wherein said at least two subsets comprises exactly two subsets and said pixel groups all include exactly two pixels and wherein said producing comprises:
    setting each said difference value equal to a difference in pixel values between said exactly two pixels of each said pixel group.

9. The method of claim 1 wherein said at least two subsets comprises only said first subset and said second subset and said block comprises a checkerboard distribution pattern of pixels of said first subset and said second subset.

10. The method of claim 1 further comprising:
    changing said block difference value by a shift quantity.

11. The method of claim 10 wherein said shift quantity has a predetermined magnitude.

12. The method of claim 10 wherein said changing said block difference value causes a bit value to be embedded in said block of said image.

13. The method of claim 10 further comprising:
    establishing a difference value threshold.

14. The method of claim 13 wherein said shift quantity exceeds a magnitude of said difference value threshold.

15. The method of claim 10 wherein said changing said block difference value comprises:
    embedding a logical-1 bit value in said block of said image.

16. The method of claim 15 wherein said embedded bit value is recoverable.

17. The method of claim 15 wherein said embedding comprises:
    concealing said bit value in said block of said image.

18. The method of claim 15 wherein said embedding comprises:
    providing at least a portion of a digital signature in said block of said image.

19. The method of claim 1 wherein said pixel values are gray-scale values.

20. The method of claim 1 wherein said pixel values comprise chromatic information.

21. A method, comprising:
    dividing a block of an image into at least two subsets of pixels, the block including an embedded bit value;
    forming a plurality of pixel groups from said at least two subsets of pixels, each said pixel group having at least one pixel from a first of said at least two subsets and at least one pixel from a second of said at least two subsets;
    producing a plurality of difference values, each said pixel group providing one of said difference values, each said difference value being based on differences between pixel values of pixels within one of said pixel groups;
    extracting said embedded bit value from said block;
    restoring said pixel values to a condition of said pixel values prior an introduction of said embedded bit value, said restoring comprising maintaining pixel values of pixels in at least one of said subsets unchanged;
    identifying a contrast status of said block, wherein said identifying said contrast status further comprises identifying a block difference value for said block; and
    customizing said extracting according to said contrast status.

22. The method of claim 21 wherein said extracting comprises:
    extracting a logical-1 bit value from said block if said block difference value exceeds a difference value threshold.

23. The method of claim 21 wherein said extracting comprises:
    extracting a logical-0 bit value from said block if said block difference value is less than a difference value threshold.

24. The method of claim 21 further comprising:
    customizing said restoring according to said contrast status.

25. The method of claim 21 wherein said identifying said contrast status further comprises:
    identifying a status of a histrogram of said block.

26. The method of claim 21 further comprising:
    employing error correction decoding to correct any error in said extracted embedded bit value.

27. A method, comprising:
    identifying at least two subsets of pixels within a block of an image;
    forming a plurality of pixel groups from said at least two subsets of pixels, each said pixel group having at least one pixel from a first of said at least two subsets and at least one pixel from a second of said at least two subsets;
    producing a plurality of difference values, each said pixel group providing one of said difference values, each said difference value being based on differences between pixel values of pixels within one of said pixel groups;

calculating an initial block difference value for said block of said image, said initial block difference value being equal to an average of said plurality of difference value; and establishing a final block difference value for said block of said image based on one of a logical-0 bit value and a logical-1 bit value indicated for inclusion in said block, said establishing comprising leaving pixel values for pixels within at least one of said subsets unchanged.

28. The method of claim 27 wherein said establishing said final block difference value comprises:

changing said initial block difference value by a shift quantity, thereby embedding a logical-1 bit value in said block of said image.

29. The method of claim 28 wherein said changing said initial block difference value comprises:

changing pixel values of pixels within only one of said subsets.

30. The method of claim 27 wherein said establishing said final block difference value comprises:

leaving said initial block difference value unchanged, thereby embedding a logical-0 bit value in said block of said image.

31. An apparatus, comprising:

a computing system having at least one processor capable of operative communication with a main memory; and a local memory coupled to each of said at least one processor, wherein said computing system is operable to:

identify at least two subsets of pixels within a block of an image, form a plurality of pixel groups from said at least two subsets of pixels, each said pixel group having at least one pixel from a first of said at least two subsets and at least one pixel from a second of said at least two subsets, produce a plurality of difference values, each said pixel group providing one of said difference values, each said difference value being based on differences between pixel values of pixels within one of said pixel groups; and modify pixel values of pixels in less than all of said at least two subsets, thereby embedding a bit value into said block;

wherein said computing system is further operable to identify a contrast status of said block and customize said modifying according to said contrast status, wherein said operability to identify said contrast status further comprises:

operability to identify a status of a histogram of said block, wherein said operability to identify said contrast status comprises:

operability to identify a block difference value for said block, said block difference value being equal to an arithmetic average of said difference values.

32. The apparatus of claim 31 wherein said less than all subsets consists of only one subset.

33. The apparatus of claim 31 wherein said operability to modify is operable to cause a logical-1 bit value to be embedded into said block.

34. The apparatus of claim 31 wherein said computing system is further operable to:

employ error correction coding to correct any bit errors in said block.

35. An apparatus comprising:

a computing system having at least one processor capable of operative communication with a main memory; and a local memory coupled to each of said at least one processor, wherein said computing system is operable to:

divide a block of an image into at least two subsets of pixels, the block including an embedded bit value;

form a plurality of pixel groups from said at least two subsets of pixels, each said pixel group having at least one pixel from a first of said at least two subsets and at least one pixel from a second of said at least two subsets;

produce a plurality of difference values, each said pixel group providing one of said difference values, each said difference value being based on differences between pixel values of pixels within one of said pixel groups;

extract said embedded bit value from said block; and restore said pixel values to a condition of said pixel values prior an introduction of said embedded bit value, said restoring comprising maintaining pixel values of pixels in at least one of said subsets unchanged;

identify a contrast status of said block, wherein said identify said contrast status further comprises:

operability to identify a block difference value for said block; and customize said extracting according to said contrast status.

36. The apparatus of claim 35 wherein said operability to extract comprises:

operability to extract a logical-1 bit value from said block if said block difference value exceeds a difference value threshold.

37. The apparatus of claim 35 wherein said operability to extract comprises:

operability to extract a logical-0 bit value from said block if said block difference value is less than a difference value threshold.

38. The apparatus of claim 35 wherein said computing system is further operable to:

customize said restoring according to said contrast status.

39. The apparatus of claim 35 wherein said operability to identify said contrast status comprises:

operability to identify a status of a histogram of said block.

40. The apparatus of claim 35 wherein said computing system is further operable to:

employ error correction decoding to correct any error in said extracted embedded bit value.

41. A computer-readable storage medium containing an executable program, the executable program being operable to cause a computing system to execute actions including:

identifying at least two subsets of pixels within a block of an image;

forming a plurality of pixel groups from said at least two subsets of pixels, each said pixel group having at least one pixel from a first of said at least two subsets and at least one pixel from a second of said at least two subsets;

producing a plurality of difference values, each said pixel group providing one of said difference values, each said difference value being based bon differences between pixel values of pixels within one of said pixel groups; and modifying pixel values of pixels in less than all of said at least two subsets, thereby embedding a bit value into said block, identifying a contrast status of said block, wherein said identifying said contrast status further comprises:
identifying a status of a histogram of said block,
identifying a block difference value for said block, wherein said block difference value being equal to an arithmetic average of said block difference values; and
customizing said modifying according to said contrast status.

42. The computer-readable storage medium of claim 41 wherein said less than all subsets consists of only one subset.

43. The computer-readable storage medium of claim 41 wherein said modifying causes a logical-1 bit value to be embedded into said block.

44. The computer-readable storage medium of claim 41 wherein said executable program is operable to cause said computing system to execute the further action of:
employing error correction coding to correct any bit errors in said block.

45. A computer-readable storage medium containing an executable program, the executable program being operable to cause a computing system to execute actions including:
dividing a block of an image into at least two subsets of pixels, the block including an embedded bit value;
forming a plurality of pixel groups from said at least two subsets of pixels, each said pixel group having at least one pixel from a first of said at least two subsets and at least one pixel from a second of said at least two subsets;
producing a plurality of difference values, each said pixel group providing one of said difference values, each said difference value being based on differences between pixel values of pixels within one of said pixel groups;
extracting said embedded bit value from said block;
restoring said pixel values to a condition of said pixel values prior an introduction of said embedded bit value, said restoring comprising maintaining pixel values of pixels in at least one of said subsets unchanged
identifying a contrast status of said block, wherein said identifying said contrast status further comprises identifying a block difference value for said block; and
customizing said extracting according to said contrast status.

46. The computer-readable storage medium of claim 45 wherein said extracting comprises:
extracting a logical-1 bit value from said block if said block difference value exceeds a difference value threshold.

47. The computer-readable storage medium of claim 45 wherein said extracting comprises:
extracting a logical-0 bit value from said block if said block difference value is less than a difference value threshold.

48. The computer-readable storage medium of claim 45 wherein the executable program is operable to cause a computing system to execute the further actions of:
customizing said restoring according to said contrast status.

49. The computer-readable storage medium of claim 45 wherein said identifying said contrast status comprises:
identifying a status of a histogram of said block.

50. The computer-readable storage medium of claim 45 wherein the executable program is operable to cause a computing system to execute the further action of:
employing error correction decoding to correct any error in said extracted embedded bit value.

* * * * *